United States Patent
Oosawa

(10) Patent No.: US 10,408,271 B2
(45) Date of Patent: Sep. 10, 2019

(54) TORQUE TRANSMISSION JOINT AND WORM REDUCTION GEAR

(71) Applicant: NSK LTD., Tokyo (JP)

(72) Inventor: Ryou Oosawa, Maebashi (JP)

(73) Assignee: NSK LTD., Tokyo (JP)

(*) Notice: Subject to any disclaimer, the term of this patent is extended or adjusted under 35 U.S.C. 154(b) by 30 days.

(21) Appl. No.: 15/564,473

(22) PCT Filed: Apr. 15, 2016

(86) PCT No.: PCT/JP2016/062179
§ 371 (c)(1),
(2) Date: Oct. 5, 2017

(87) PCT Pub. No.: WO2016/171092
PCT Pub. Date: Oct. 27, 2016

(65) Prior Publication Data
US 2018/0080502 A1 Mar. 22, 2018

(30) Foreign Application Priority Data

Apr. 22, 2015 (JP) .................................. 2015-087823

(51) Int. Cl.
*F16D 3/18* (2006.01)
*F16D 1/02* (2006.01)
(Continued)

(52) U.S. Cl.
CPC .................. *F16D 1/02* (2013.01); *F16D 1/10* (2013.01); *F16D 3/18* (2013.01); *F16H 1/16* (2013.01);
(Continued)

(58) Field of Classification Search
CPC ..... F16H 1/16; F16D 3/18; F16D 1/10; B62D 5/0409
See application file for complete search history.

(56) References Cited

U.S. PATENT DOCUMENTS

| 1,983,007 A | 12/1934 | Simons |
| 2,114,807 A | 11/1937 | McCavitt |
| (Continued) | | |

FOREIGN PATENT DOCUMENTS

| CH | 564 999 A5 | 8/1975 |
| CN | 1738983 A | 2/2006 |
| (Continued) | | |

OTHER PUBLICATIONS

Communication dated Feb. 25, 2019, from the European Patent Office in counterpart European Application No. 16783113.0.
(Continued)

*Primary Examiner* — David M Fenstermacher
(74) *Attorney, Agent, or Firm* — Sughrue Mion, PLLC

(57) ABSTRACT

At a state where central axes of the drive shaft and the driven shaft are matched, the drive-side concave-convex portion is engaged with a half portion on the other axial side of the coupling-side concave-convex portion with a drive-side gap of which a circumferential width size increases towards the other axial side being interposed between a circumferential side surface of each drive-side convex portion and a circumferential side surface of each coupling-side convex portion. At the state where the central axes of the drive shaft and the driven shaft are matched, the driven-side concave-convex portion is engaged with a half portion on one axial side of the coupling-side concave-convex portion with a driven-side gap of which a circumferential width size increases towards one axial side being interposed between a circumferential side surface of each driven-side convex portion and a circumferential side surface of each coupling-side convex portion.

19 Claims, 26 Drawing Sheets

(51) Int. Cl.
*F16H 1/16* (2006.01)
*F16D 1/10* (2006.01)
*B62D 5/04* (2006.01)

(52) U.S. Cl.
CPC ...... *B62D 5/0409* (2013.01); *F16D 2001/103* (2013.01)

(56) References Cited

U.S. PATENT DOCUMENTS

| | | | | |
|---|---|---|---|---|
| 2,682,760 | A | | 7/1954 | Shenk |
| 2,841,966 | A | | 7/1958 | Belden et al. |
| 2,979,147 | A | * | 4/1961 | Naumann ............... F16D 3/065 180/358 |
| 2,995,908 | A | * | 8/1961 | Mazziotti ............... F16D 3/065 464/168 |
| 3,045,457 | A | * | 7/1962 | Blanchard ............... F16D 3/065 416/229 R |
| 3,080,732 | A | * | 3/1963 | Crankshaw ............. F16D 3/185 464/156 |
| RE25,489 | E | * | 11/1963 | Anderson ............... F16D 3/065 464/168 |
| 3,620,043 | A | * | 11/1971 | Gantschnigg ......... B21B 35/144 464/156 |
| 4,175,404 | A | * | 11/1979 | Schopf ...................... F16D 1/06 403/359.6 |
| 4,493,622 | A | * | 1/1985 | Miller ...................... F04C 14/10 417/310 |
| 4,768,994 | A | * | 9/1988 | Stenglein ................ F16D 3/065 464/111 |
| 5,356,342 | A | | 10/1994 | White |
| 7,156,628 | B2 | * | 1/2007 | White ....................... F04C 2/104 418/61.3 |
| 8,469,595 | B2 | * | 6/2013 | Iizumi ................. F16C 29/0685 384/43 |

| | | | |
|---|---|---|---|
| 2002/0195893 | A1 | 12/2002 | Kobayashi et al. |
| 2006/0117889 | A1 | 6/2006 | Segawa et al. |
| 2007/0251757 | A1 | 11/2007 | Segawa et al. |
| 2007/0251758 | A1 | 11/2007 | Segawa et al. |

FOREIGN PATENT DOCUMENTS

| | | |
|---|---|---|
| EP | 1 637 769 A1 | 3/2006 |
| GB | 731109 A | 6/1955 |
| GB | 2040397 A | 8/1980 |
| JP | S 48-82344 A | 10/1973 |
| JP | H 8-61450 A | 3/1996 |
| JP | 2001-3946 A | 1/2001 |
| JP | 2003-72563 A | 3/2003 |
| JP | 2004-306898 A | 11/2004 |
| JP | 2011-38600 A | 2/2011 |
| JP | 2012131249 A | 7/2012 |

OTHER PUBLICATIONS

Communication dated Aug. 28, 2018, issued by the Japanese Patent Office in counterpart Japanese Patent Application No. 2017-514104.
International Search Report dated Jul. 19, 2016, issued by the International Searching Authority in counterpart International Application No. PCT/JP2016/062179 (PCT/ISA/210).
Written Opinion dated Jul. 19, 2016, issued by the International Searching Authority in counterpart International Application No. PCT/JP2016/062179 (PCT/ISA/237).
Communication dated Jun. 29, 2018, issued by the European Patent Office in counterpart European Application No. 16783113.0.
Chinese Office Action dated Apr. 9, 2019 issued by the State Intellectual Property Office of P.R. China in counterpart Chinese Application No. 201680020926.4.
Communication dated Jun. 4, 2019, issued by the Japanese Patent Office in counterpart Japanese Patent Application No. 2017-514104.

* cited by examiner

TORQUE TRANSMISSION JOINT AND WORM REDUCTION GEAR

TECHNICAL FIELD

A torque-transmission joint of the present invention is to be incorporated into a variety of mechanical apparatuses and is configured to transmit torque between a drive shaft and a driven shaft. Also, a worm reduction gear of the present invention is to be incorporated into an electric power steering device, for example.

RELATED ART

When applying a steering angle to steered wheels (generally, front wheels except for a special vehicle such as a forklift), a power steering device has been widely used as a device for reducing a force necessary for a driver to operate a steering wheel. Also, regarding the power steering device, an electric power steering device configured to use an electric motor as an auxiliary power source has also been recently spread. In the electric power steering device, auxiliary power of the electric motor is applied to a steering shaft, which is configured to rotate in accordance with an operation of the steering wheel, or a member that is configured to be displaced as the steering shaft rotates, via a reduction gear. A direction of the auxiliary power that is to be applied from the electric motor is the same as that of a force that is to be applied from the steering wheel. As the reduction gear, a worm reduction gear is generally used. According to the electric power steering device using the worm reduction gear, a worm configured to rotate by the electric motor and a worm wheel are meshed with each other. The worm wheel is configured to rotate together with a rotary shaft, which is a member engaged so that the power can be transmitted to the steering shaft or the member configured to be displaced as the steering shaft rotates. In this way, the auxiliary power of the electric motor is freely transmitted to the rotary shaft. In the worm reduction gear, when changing a rotating direction of the rotary shaft, an uncomfortable abnormal noise referred to as gear-tooth striking sound may be generated due to a backlash existing at the meshed part between the worm and the worm wheel, if any measures are not taken.

In order to suppress the gear-tooth striking sound, it has been considered to elastically press the worm towards the worm wheel by an elastic member such as a spring. FIGS. 20 and 21 depict an example of the electric power steering device disclosed in Patent Document 1. A front end portion of a steering shaft 2 configured to rotate in a predetermined direction by a steering wheel 1 is rotatably supported in a housing 3 and a worm wheel 4 is fixed to the corresponding part. Also, worm teeth 6 are provided on an axially intermediate part of a worm 8. At a state where the worm teeth 6 and a tooth part 5 formed on an outer peripheral surface of the worm wheel 4 are meshed, the worm 8 is rotatably supported at two axial positions (both axial positions of the worm teeth 6), at which the worm teeth 6 are interposed therebetween, in the housing 3 by a pair of rolling bearings 9a, 9b such as deep groove ball bearings or the like. The worm 8 is configured to be rotatable by an output shaft of an electric motor 7 connected to a base end portion thereof. Also, a pressing piece 10 is externally fitted to a tip end portion of the worm 8, which protrudes beyond the rolling bearing 9a. An elastic member such as a coil spring 11 is provided between the pressing piece 10 and the housing 3. By the coil spring 11, the worm teeth 6 of the worm 8 are pressed towards the tooth part 5 of the worm wheel 4 via the pressing piece 10. By this configuration, the backlash between the worm teeth 6 and the tooth part 5 is suppressed, so that the gear-tooth striking sound is suppressed.

According to the above structure of the related art, it is possible to suppress the gear-tooth striking sound from being generated at the meshed part between the worm teeth 6 and the tooth part 5. However, it is not possible to suppress an abnormal noise, which is to be generated at a coupled part between a tip end portion of the output shaft 12 of the electric motor 7 and the base end portion of the worm 8. This situation is described as follows. In the shown structure, in order to couple the tip end portion of the output shaft 12 of the electric motor 7 and the base end portion of the worm 8 so that the torque can be transmitted, the base end portion of the worm 8 is formed with a spline hole 13. The spline hole 13 opens towards a base end surface of the worm 8. In the meantime, the tip portion of the output shaft 12 is formed with a spline shaft part 14. The spline shaft part 14 and the spline hole 13 are spline-engaged, so that the output shaft 12 and the worm 8 are coupled so that the torque can be transmitted.

When the spline shaft part 14 and the spline hole 13 are spline-engaged without a circumferential gap (without the backlash), the abnormal noise does not occur at the coupled part (the spline engagement part) between the tip portion of the output shaft 12 and the base end portion of the worm 8. However, as shown in FIG. 21, according to the structure where the worm teeth 6 of the worm 8 is elastically pressed towards the tooth part 5 of the worm wheel 4 by the coil spring 11 so as to suppress the backlash between the worm teeth 6 and the tooth part 5, since it is necessary to cause the worm 8 to oscillate and be displaced, it is not possible to completely remove the backlash of the spline engagement part, so that it is difficult to prevent the abnormal noise.

Patent Document 2 discloses a structure where the output shaft of the electric motor and the worm shaft are coupled via a metallic cylindrical power transmission member for smooth oscillation and displacement of the worm shaft. Also in the structure of Patent Document 2, since the worm shaft is caused to oscillate and be displaced, the backlashes exist at the spline engagement parts between the spline shaft parts (male splines) provided at both end portions of the power transmission member and the spline holes (female splines) provided at respective end portions of the worm shaft and the output shaft of the electric motor, respectively. For this reason, the abnormal noise may be generated when changing a rotating direction of the rotary shaft.

CITATION LIST

Patent Documents

Patent Document 1: Japanese Patent Application Publication No. 2004-306898A

Patent Document 2: Japanese Patent Application Publication No. 2012-131249A

SUMMARY OF THE INVENTION

Problems to be Solved

The present invention has been made in view of the above situations, and an object of the present invention is to implement a torque-transmission joint capable of smoothly transmitting torque between a drive shaft and a driven shaft even when central axes of the drive shaft and the driven shaft are mismatched each other and preventing an abnormal noise from being generated between the drive shaft and the driven shaft.

Means for Solving the Problems

Regarding a torque-transmission joint and a worm reduction gear of the present invention, the torque-transmission joint is configured to transmit torque between one axial end portion of a drive shaft and the other axial end portion of a driven shaft arranged in series with each other in an axial direction, and includes a coupling, a drive-side transmission part and a driven-side transmission part.

The coupling is provided on one circumferential surface of inner and outer circumferential surfaces with a coupling-side concave-convex portion having coupling-side convex portions arranged at a plurality of circumferential places and protruding in a radial direction (a radially inner side when the one circumferential surface is the inner peripheral surface; a radially outer side when the one circumferential surface is the outer peripheral surface).

The drive-side transmission part is provided directly or via another member at one axial end portion of the drive shaft and is provided on one circumferential surface, which faces the coupling-side concave-convex portion, of inner and outer circumferential surfaces with a drive-side concave-convex portion having drive-side convex portions arranged at a plurality of circumferential places and protruding in a radial direction (a radially outer side when the circumferential surface facing the coupling-side concave-convex portion is the outer peripheral surface; a radially inner side when the circumferential surface facing the coupling-side concave-convex portion is the inner peripheral surface).

The driven-side transmission part is provided directly or via another member at the other axial end portion of the driven shaft and is provided on one circumferential surface, which faces the coupling-side concave-convex portion, of inner and outer circumferential surfaces with a driven-side concave-convex portion having driven-side convex portions arranged at a plurality of circumferential places and protruding in a radial direction (a radially outer side when the circumferential surface facing the coupling-side concave-convex portion is the outer peripheral surface; a radially inner side when the circumferential surface facing the coupling-side concave-convex portion is the inner peripheral surface).

At a state where central axes of the drive shaft and the driven shaft are matched, the drive-side concave-convex portion is engaged with a half portion on the other axial side of the coupling-side concave-convex portion with a drive-side gap of which a circumferential width size increases towards the other axial side being interposed between a circumferential side surface of each drive-side convex portion and a circumferential side surface of each coupling-side convex portion.

Also, at the state where the central axes of the drive shaft and the driven shaft are matched, the driven-side concave-convex portion is engaged with a half portion on one axial side of the coupling-side concave-convex portion with a driven-side gap of which a circumferential width size increases towards one axial side being interposed between a circumferential side surface of each driven-side convex portion and a circumferential side surface of each coupling-side convex portion.

In the meantime, when implementing the torque-transmission joint of the present invention, at the state where the central axes of the drive shaft and the driven shaft are matched, one axial end portion of the circumferential side surface of each drive-side convex portion is preferably made to contact or to closely face the circumferential side surface of each coupling-side convex portion without rattling in the circumferential direction. Also, at the state where the central axes of the drive shaft and the driven shaft are matched, the other axial end portion of the circumferential side surface of each driven-side convex portion is made to contact or to closely face the circumferential side surface of each coupling-side convex portion without rattling in the circumferential direction.

When implementing the torque-transmission joint of the present invention, the circumferential side surface of each coupling-side convex portion is inclined in a direction in which a circumferential width size of each coupling-side convex portion is greatest at an axially intermediate portion and decreases towards both axial end portions (inclined in a direction in which a circumferential protruding amount decreases towards an axial end portion). In this case, specifically, the circumferential side surface of each coupling-side convex portion may be formed to have a crowning shape having a partial arc shape as seen from a radial direction or to have a linear tapered shape. Alternatively, the axially intermediate portions of both circumferential side surfaces of each coupling-side convex portion may be provided with flat surface portions parallel with each other, and both axial end portions may be provided with tapered surface portions having a linear shape as seen from a radial direction. In this case, a continuing portion of the flat surface portion and the tapered surface portion is preferably made to be continued by a convex curved surface having an arc section. In this case, for example, both circumferential side surfaces of each of the drive-side and driven-side convex portions may be configured as flat surfaces parallel with each other or may adopt a configuration defined in Claim 3.

Also, the circumferential side surface of each drive-side convex portion is inclined in a direction in which a circumferential width size of each drive-side convex portion is greatest at an axially intermediate portion and decreases towards both axial end portions, and the circumferential side surface of each driven-side convex portion is inclined in a direction in which a circumferential width size of each driven-side convex portion is greatest at an axially intermediate portion and decreases towards both axial end portions. In this case, specifically, the circumferential side surface of each of the drive-side and driven-side convex portions may be formed to have a crowning shape having a partial arc shape as seen from a radial direction or to have a linear tapered shape. Alternatively, the axially intermediate portions of both circumferential side surfaces of each of the drive-side and driven-side convex portions may be provided with flat surface portions parallel with each other, and both axial end portions may be provided with tapered surface portions having a linear shape as seen from a radial direction. In this case, a continuing portion of the flat surface portion and the tapered surface portion is preferably made to be continued by a convex curved surface having an arc section.

When implementing the torque-transmission joint of the present invention, grease is preferably interposed between both the drive-side and driven-side concave-convex portions and the coupling-side concave-convex portion.

When implementing the torque-transmission joint of the present invention, at least one of the circumferential side surface of each of the drive-side and driven-side convex portions and the circumferential side surface of each coupling-side convex portion is preferably provided with a plurality of minute concave portions.

When implementing the present invention configured in this way, shot blast is performed for at least one of the circumferential side surface of each of the drive-side and driven-side convex portions and the circumferential side surface of each coupling-side convex portion, so that the plurality of minute concave portions is formed.

When implementing the torque-transmission joint of the present invention, preferably, one circumferential surface of both the inner and outer circumferential surfaces of the coupling is formed with a coupling-side protrusion protruding in the radial direction, and the coupling-side protrusion is positioned between the drive-side transmission part and the driven-side transmission part in the axial direction.

When implementing the torque-transmission joint of the present invention, preferably, both axial side surfaces of the coupling are formed with coupling-side groove portions at a plurality of places in the circumferential direction, and the coupling-side groove portions and are arranged at positions at which the coupling-side groove portions overlap with coupling-side concave portions, which are formed between the coupling-side convex portions adjacent to each other in the circumferential direction and which configures the coupling-side concave-convex portion, in the circumferential direction.

Also, the worm reduction gear of the present invention includes a housing, a worm wheel, a worm and an electric motor, for example.

The worm wheel is rotatably supported to the housing.

The worm is rotatably supported to the housing at a state where worm teeth provided on an axially intermediate portion thereof are meshed with the worm wheel.

The electric motor is provided to rotatively drive the worm.

The worm and an output shaft of the electric motor are connected by a torque-transmission joint so that torque can be transmitted.

Particularly, in the worm reduction gear of the present invention, the torque-transmission joint is configured by the above-described torque-transmission joint of the present invention. In this case, the output shaft of the electric motor corresponds to the drive shaft, and the worm shaft corresponds to the driven shaft.

When implementing the worm reduction gear of the present invention, a preload applying mechanism configured to elastically press the worm towards the worm wheel is preferably provided between a tip portion of the worm (an end portion opposite to a side coupled to the output shaft of the electric motor via the torque-transmission joint) and the housing.

Effects of the Invention

According to the torque-transmission joint and the worm reduction gear of the present invention, even when the central axes of the drive shaft and the driven shaft are mismatched, it is possible to smoothly transmit the torque between the drive shaft and the driven shaft, so that it is possible to easily prevent an abnormal noise from being generated between the drive shaft and the driven shaft.

That is, according to the present invention, the drive-side gap and the driven-side gap, which are the circumferential gaps, are respectively provided between the coupling-side concave-convex portion and the drive-side concave-convex portion and between the coupling-side concave-convex portion and the drive-side concave-convex portion. Therefore, when the central axes of the drive shaft and the driven shaft are mismatched, the coupling is inclined relative to at least one shaft of the drive shaft and the driven shaft, based on the drive-side gap and the driven-side gap. Thereby, it is possible to smoothly transmit the torque between the drive shaft and the driven shaft.

Also, according to the present invention, the coupling can be caused to oscillate on the basis of the drive-side gap and the driven-side gap. For this reason, it is possible to bring one axial end portion of the circumferential side surface of each drive-side convex portion and the other axial end portion of the circumferential side surface of each driven-side convex portion into contact with or to closely face the circumferential side surface of each coupling-side convex portion without the rattling in the circumferential direction. According to this configuration, it is possible to bring a part of the circumferential side surface of each of the drive-side and driven-side convex portions into contact with or to closely face the circumferential side surface of each coupling-side convex portion, irrespective of whether the central axes of the drive shaft and the driven shaft are matched or not. Therefore, it is possible to prevent the circumferential side surface of each of the drive-side and driven-side convex portions and the circumferential side surface of each coupling-side convex portion from strongly colliding (hard colliding) with each other, so that it is possible to prevent the abnormal noise from being generated at a collision part between the respective circumferential side surfaces.

DETAILED DESCRIPTION OF EMBODIMENTS

[First Example of Embodiment]

Figure 1:
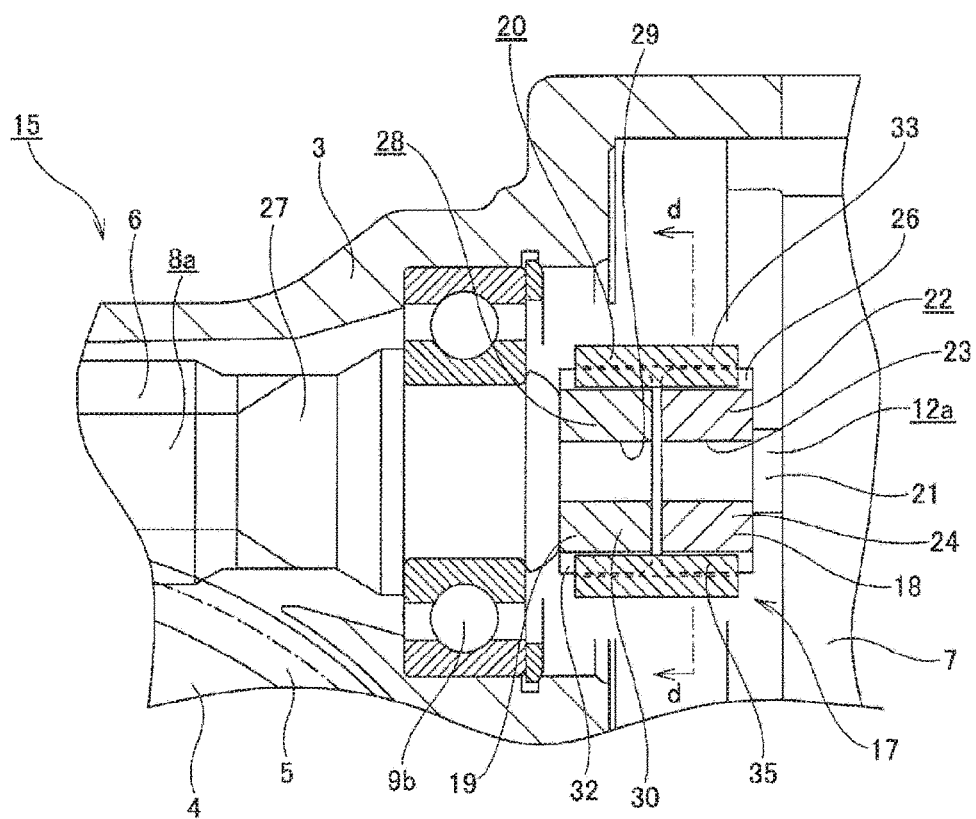
FIG. 1 is an enlarged sectional view of main parts, depicting a first example of an embodiment.
Figure 2A:
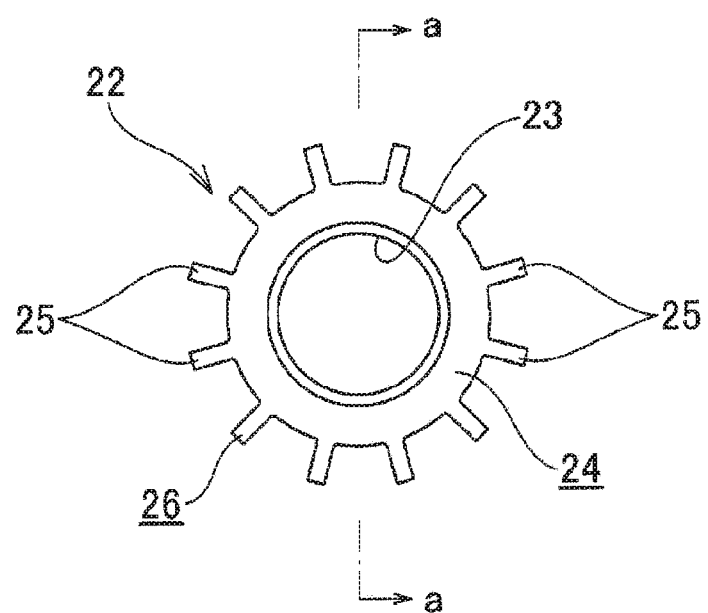
FIG. 2A is an end view of a drive-side transmission member.
Figure 2B:
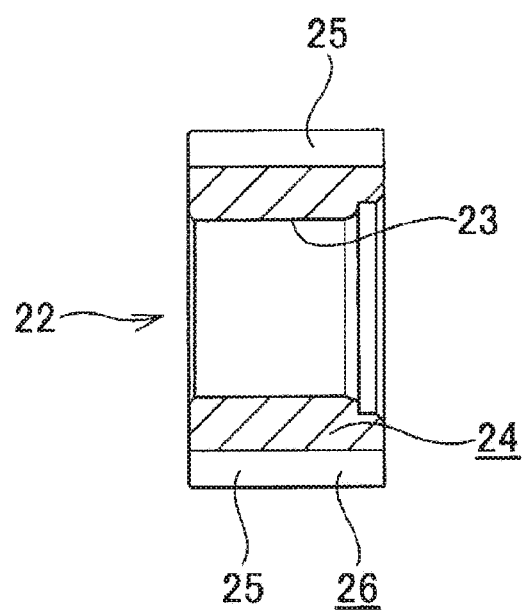
FIG. 2B is a sectional view taken along a line a-a of FIG. 2A.
Figure 3A:
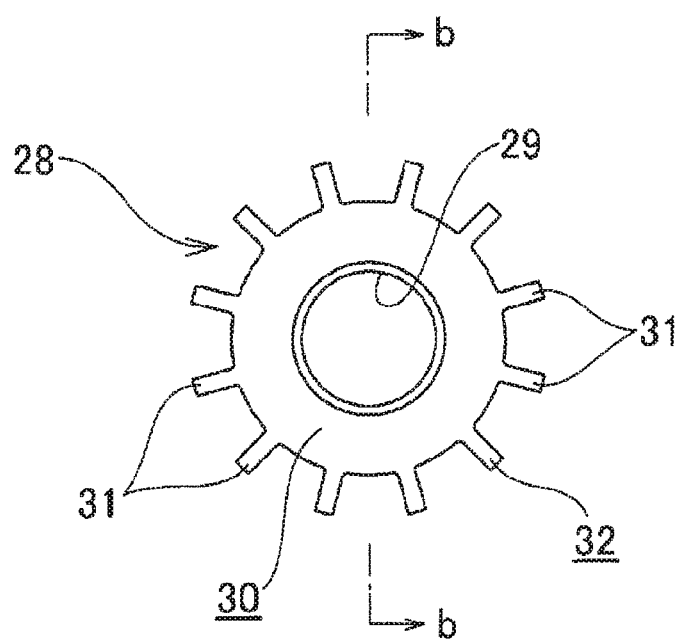
FIG. 3A is an end view of a driven-side transmission member.
Figure 3B:
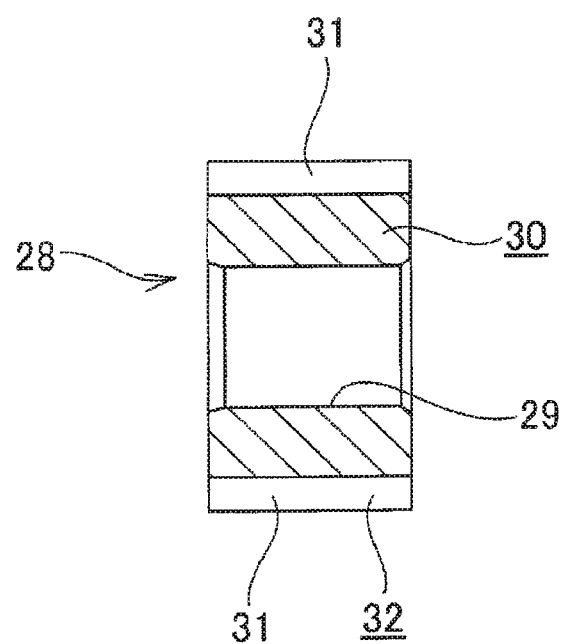
FIG. 3B is a sectional view taken along a line b-b of FIG. 3A.
Figure 4A:
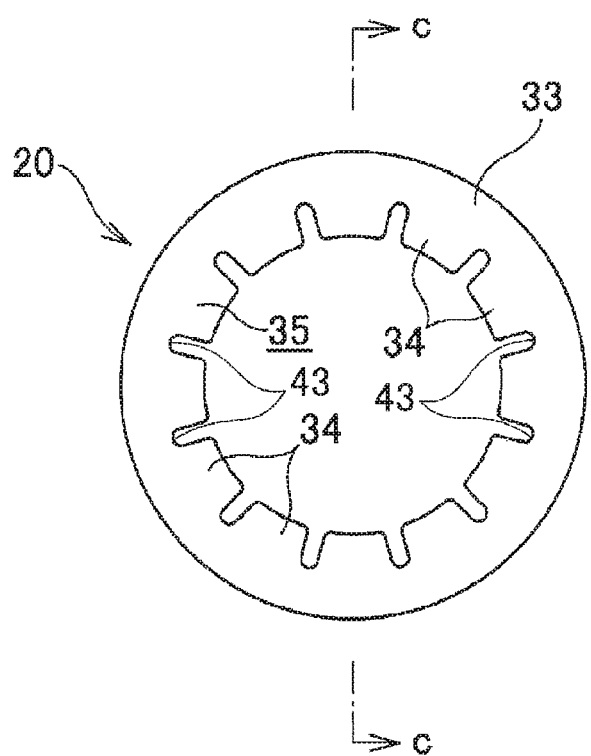
FIG. 4A is an end view of a coupling.
Figure 4B:
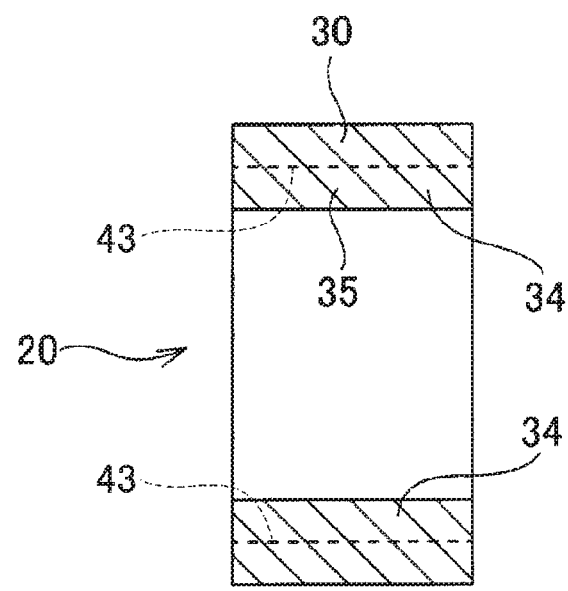
FIG. 4B is a sectional view taken along a line c-c of FIG. 4A.
Figure 5A:
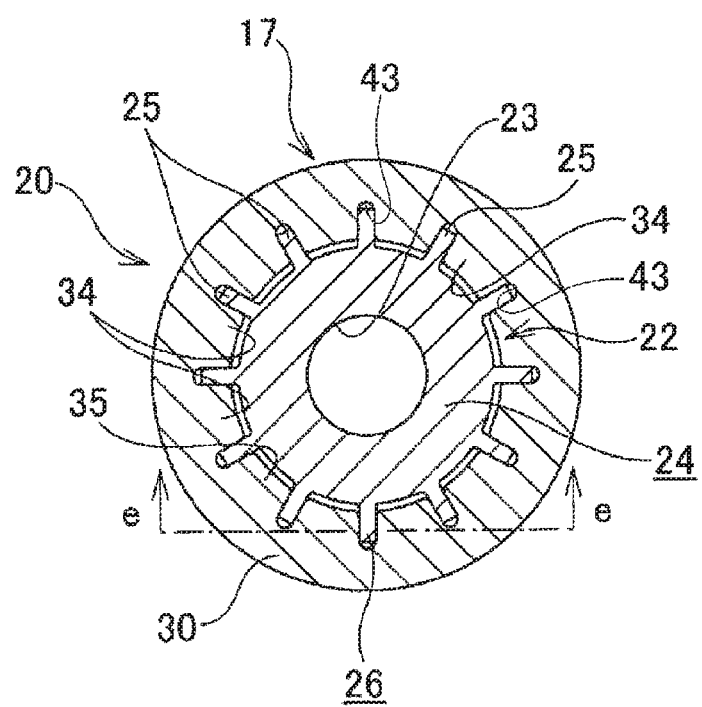
FIG. 5A is a sectional view taken along a line d-d of FIG. 1.
Figure 5B:
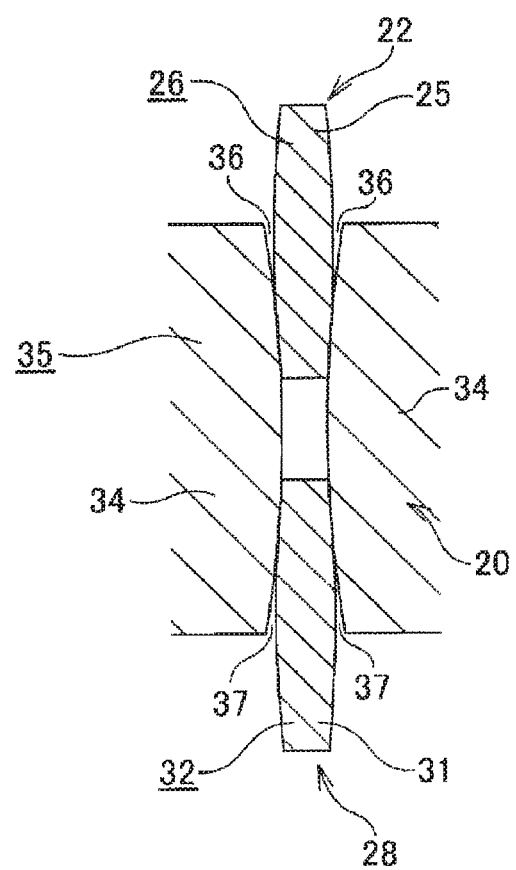
FIG. 5B is a sectional view taken along a line e-e of FIG. 5A.

FIGS. 1 to 5B depict a first example of an embodiment of the present invention. The first example has a feature of implementing a structure where even when central axes of an output shaft 12a of an electric motor 7, which is a drive shaft, and a worm 8a, which is a driven shaft, are mismatched, it is possible to smoothly transmit torque between the output shaft 12a and the worm 8a. A worm reduction gear 15 of the first example includes a housing 3, a worm wheel 4, the worm 8a and the electric motor 7.

The worm wheel 4 is supported to be freely rotatable inside the housing 3. An outer peripheral surface of the worm wheel 4 is formed with a tooth part 5.

Figure 21:
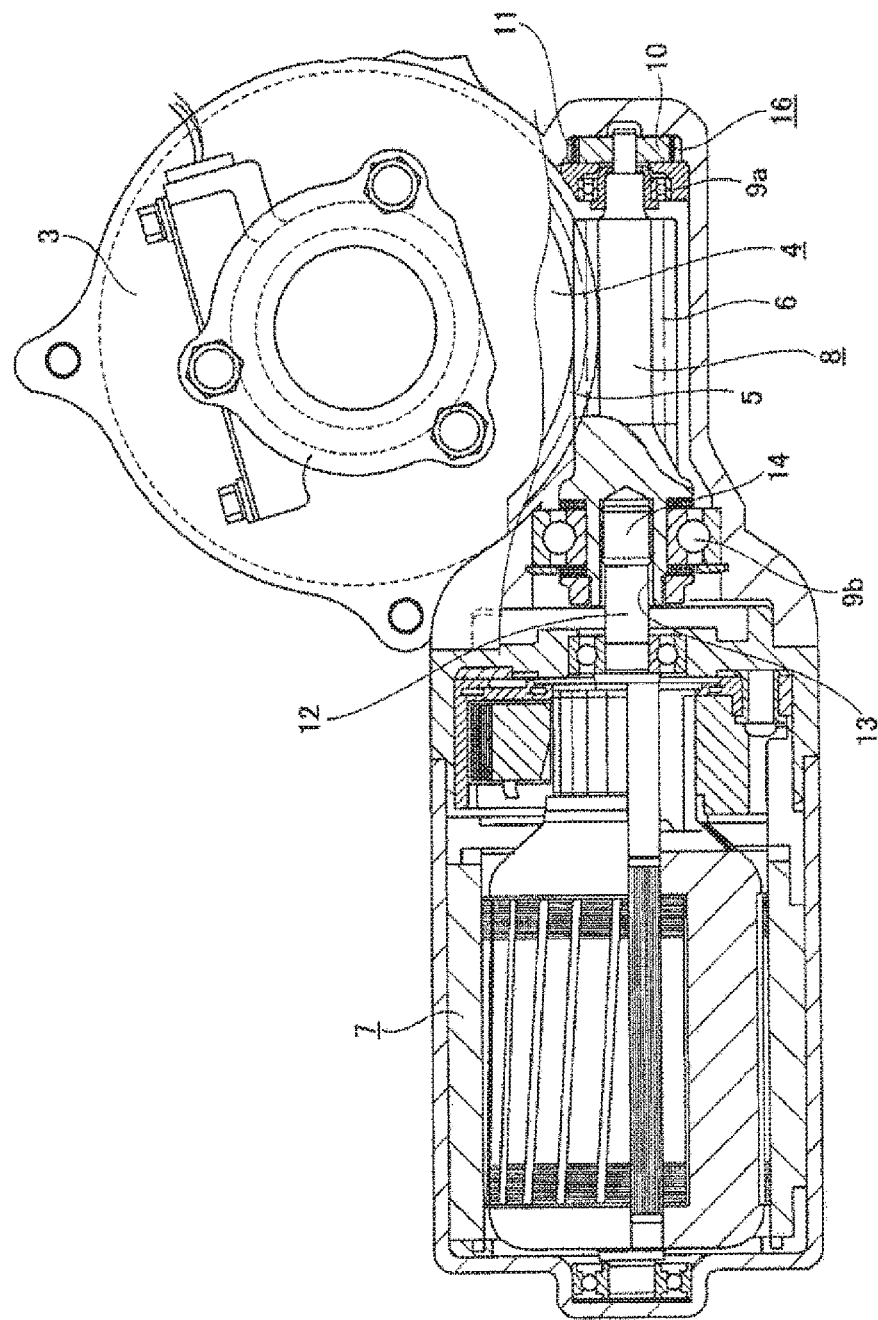
FIG. 21 is an enlarged sectional view taken along a line h-h of FIG. 20, depicting an example of a conventional structure of an electric power steering device.

At a state where worm teeth 6 provided on an axially intermediate portion of the worm 8a and the tooth part 5 of the worm wheel 4 are meshed, the worm 8a is supported to be freely rotatable at two axial positions (both axial positions of the worm teeth 6), at which the worm teeth 6 are interposed therebetween, in the housing 3 by a pair of rolling bearings 9a, 9b (refer to FIG. 21) such as deep groove ball bearings or the like. In the meantime, a preload applying mechanism 16 (refer to FIG. 21) having a pressing piece 10 and a coil spring 11 is provided between a tip end portion of the worm 8a and the housing 3. The preload applying mechanism 16 is configured to press the worm teeth 6 provided on the worm 8a towards the tooth part 5 of the worm wheel 4. By this configuration, a backlash between the worm teeth 6 and the tooth part 5 is suppressed, so that a gear-tooth striking sound is suppressed.

The electric motor 7 is supported and fixed to the housing 3. A tip end portion (one axial end portion; a left end portion in FIG. 1) of the output shaft 12a of the electric motor 7 is connected to a base end portion (the other axial end portion; a right end portion in FIG. 1) of the worm 8a. Thereby, the worm 8a can be rotatively driven by the electric motor 7.

The tip end portion of the output shaft 12a of the electric motor 7 and the base end portion of the worm 8a are coupled via a torque-transmission joint 17 so that torque can be transmitted. The torque-transmission joint 17 has a drive-side transmission part 18, a driven-side transmission part 19 and a coupling 20.

The drive-side transmission part 18 has a drive-side transmission member 22 that is provided separately from an output shaft main body 21 of the output shaft 12a and is supported and fixed to a tip end portion of the output shaft main body 21. The drive-side transmission member 22 is made of a synthetic resin such as polyamide resin or sintered metal, for example. The drive-side transmission member 22 has a drive-side cylindrical part 24 and a drive-side concave-convex portion 26. The drive-side cylindrical part 24 is formed at its central portion with a drive-side engaging hole 23. The drive-side concave-convex portion 26 has drive-side convex portions 25, 25 protruding radially outwards (radial direction) and formed on an outer peripheral surface of the drive-side cylindrical part 24 at a plurality of places with equal intervals in a circumferential direction over an entire axial width. The drive-side engaging hole 23 of the drive-side cylindrical part 24 is externally fitted and fixed to an outer peripheral surface of the tip end portion of the output shaft main body 21 by interference fit, spline engagement, key engagement or the like with relative rotation being hindered (so that the torque can be transmitted), so that the drive-side transmission member 22 is supported and fixed to the tip end portion of the output shaft main body 21. Also, when seen from a radial direction, both circumferential side surfaces of each of the drive-side convex portions 25, 25 of the drive-side concave-convex portion 26 have a crowning shape having a partial arc shape inclined in a direction in which a circumferential width size of each of the drive-side convex portions 25, 25 is greatest (thickest) at an axially intermediate portion and decreases (thins) towards both axial end portions. However, both circumferential side surfaces of each of the drive-side convex portions 25, 25 may have a linear tapered shape inclined in a direction in which the circumferential width size of each of the drive-side convex portions 25, 25 is greatest at the axially intermediate portion and decreases towards both axial end portions, when seen from a radial direction. Alternatively, the axially intermediate portions of both circumferential side surfaces of each of the drive-side convex portions 25, 25 may be provided with flat surface portions parallel with each other, and both axial end portions may be provided with tapered surface portions having a linear shape as seen from a radial direction. In this case, a continuing portion of the flat surface portion and the tapered surface portion is preferably made to be continued by a convex curved surface having an arc section. Also, the circumferential width size of each of the drive-side convex portions 25, 25 is substantially constant over a radial direction.

The driven-side transmission part 19 has a driven-side transmission member 28 that is provided separately from a worm shaft main body 27 of the worm 8a and is supported and fixed to a base end portion of the worm shaft main body 27. The driven-side transmission member 28 is made of a synthetic resin such as polyamide resin or sintered metal, for example. The driven-side transmission member 28 has a driven-side cylindrical part 30 and a driven-side concave-convex portion 32. The driven-side cylindrical part 30 is formed at its central portion with a driven-side engaging hole 29. The driven-side concave-convex portion 32 has driven-side convex portions 31, 31 protruding radially outwards (radial direction) and formed on an outer peripheral surface of the driven-side cylindrical part 30 at a plurality of places with equal intervals in a circumferential direction over the axial direction. The driven-side engaging hole 29 of the driven-side cylindrical part 30 is externally fitted and fixed to an outer peripheral surface of the base end portion of the worm shaft main body 27 by interference fit, spline engagement, key engagement or the like with relative rotation being hindered (so that the torque can be transmitted), so that the driven-side transmission member 28 is supported and fixed to the base end portion of the worm shaft main body 27. Also, when seen from a radial direction, both circumferential side surfaces of each of the driven-side convex portions 31, 31 of the driven-side concave-convex portion 32 have a crowning shape having a partial arc shape inclined in a direction in which a circumferential width size of each of the driven-side convex portions 31, 31 is greatest (thickest) at an axially intermediate portion and decreases (thins) towards both axial end portions. However, both circumferential side surfaces of each of the driven-side convex portions 31, 31 may have a linear tapered shape inclined in a direction in which the circumferential width size of each of the driven-side convex portions 31, 31 is greatest at the axially intermediate portion and decreases towards both axial end portions, when seen from a radial direction. Alternatively, the axially intermediate portions of both circumferential side surfaces of each of the driven-side convex portions 31, 31 may be provided with flat surface portions parallel with each other, and both axial end portions may be provided with tapered surface portions having a linear shape as seen from a radial direction. In this case, a continuing portion of the flat surface portion and the tapered surface portion is preferably made to be continued by a convex curved surface having an arc section. Also, the circumferential width size of each of the driven-side convex portions 31, 31 is substantially constant over the radial direction. Meanwhile, in the first example, each of the driven-side convex portions 31, 31 and each of the drive-side convex portions 25, 25 are configured to have the same shape.

The coupling 20 is formed to have a substantially cylindrical shape by a synthetic resin such as polyamide resin, elastomer such as rubber or a material in which reinforced fibers (for example, glass fibers, carbon fibers) are mixed in the synthetic resin or elastomer. The coupling 20 has a coupling-side cylindrical part 33 and a coupling-side concave-convex portion 35. The coupling-side concave-convex portion 35 has coupling-side convex portions 34, 34 and coupling-side concave portions 43, 43 provided over the axial direction. The coupling-side convex portions 34, 34 protrude radially inwards at a plurality of places with equal intervals in a circumferential direction of an inner peripheral surface of the coupling-side cylindrical part 33. The coupling-side concave portions 43, 43 are formed between the coupling-side convex portions 34, 34 adjacent to each other in the circumferential direction. Both circumferential side surfaces of each of the coupling-side convex portions 34, 34 of the coupling-side concave-convex portion 35 have a crowning shape having a partial arc shape inclined in a direction in which a circumferential width size of each of the coupling-side convex portions 34, 34 is greatest (thickest) at an axially intermediate portion and decreases (thins) towards both axial end portions, when seen from a radial direction. However, both circumferential side surfaces of each of the coupling-side convex portions 34, 34 may have a linear tapered shape inclined in a direction in which the circumferential width size of each of the coupling-side convex portions 34, 34 is greatest at the axially intermediate portion and decreases towards both axial end portions, when seen from a radial direction. Alternatively, the axially intermediate portions of both circumferential side surfaces of each of the coupling-side convex portions 34, 34 may be provided with flat surface portions parallel with each other, and both axial end portions may be provided with tapered surface portions having a linear shape as seen from a radial direction. In this case, a continuing portion of the flat surface portion and the tapered surface portion is preferably made to be continued by a convex curved surface having an arc section. Also, the circumferential width size of each of the coupling-side convex portions 34, 34 is configured to decrease (to have a tapered shape) towards a radially inner side. Meanwhile, in the first example, the circumferential width size of each of the coupling-side convex portions 34, 34 is made to be sufficiently larger (for example, 3 to 7 times) than the circumferential width size of each of the drive-side and driven-side convex portions 25, 31 (the coupling-side concave portions 43) over the entire axial direction.

In the worm reduction gear 15 of the first example, the drive-side concave-convex portion 26 of the drive-side transmission member 22 supported and fixed to the tip end portion of the output shaft 12a (output shaft main body 21) is engaged with a half portion on the other axial side (a right half portion in FIG. 1) of the coupling-side concave-convex portion 35 of the coupling 20. That is, the drive-side convex portions 25, 25 are engaged with the coupling-side concave portions 43, 43, and the drive-side convex portions 25, 25 and the half portions on the other axial sides of the coupling-side convex portions 34, 34 are alternately arranged in the circumferential direction.

Also, the driven-side concave-convex portion 32 of the driven-side transmission member 28 supported and fixed to the base end portion of the worm 8a (worm shaft main body 27) is engaged with a half portion on one axial side (a left half portion in FIG. 1) of the coupling-side concave-convex portion 35 of the coupling 20. That is, the driven-side convex portions 31, 31 are engaged with the coupling-side concave portions 43, 43, and the driven-side convex portions 31, 31 and the half portions on the other axial sides of the coupling-side convex portions 34, 34 are alternately arranged in the circumferential direction.

In the meantime, the drive-side concave-convex portion 26 and the driven-side concave-convex portion 32 do not overlap with each other as to the axial positions and are arranged in series in the axial direction.

Thereby, the drive-side transmission part 18 and the driven-side transmission part 19 are coupled via the coupling 20 so that the torque can be transmitted.

Particularly, in the first example, the circumferential side surfaces of the drive-side convex portions 25, 25, the driven-side convex portions 31, 31 and the coupling-side convex portions 34, 34 are respectively formed to have a crowning shape having a partial arc shape, as seen from the radial direction.

Therefore, at a state where the drive-side concave-convex portion 26 is engaged with the half portion on the other axial side of the coupling-side concave-convex portion 35 and the central axes of the output shaft 12a and the worm 8a are matched, one axial end portion of the circumferential side surface of each of the drive-side convex portions 25, 25 and the circumferential side surface of each of the coupling-side convex portions 34, 34 are contacted or closely face each other without the rattling in the circumferential direction. Also, a drive-side gap 36 of which a circumferential width size increases towards the other axial side is interposed between the other end portion from the axially intermediate portion of the circumferential side surface of each of the drive-side convex portions 25, 25 and the circumferential side surface of each of the coupling-side convex portions 34, 34.

Also, at a state where the driven-side concave-convex portion 32 is engaged with the half portion on one axial side of the coupling-side concave-convex portion 35 and the central axes of the output shaft 12*a* and the worm 8*a* are matched, the other axial end portion of the circumferential side surface of each of the driven-side convex portions 31, 31 and the circumferential side surface of each of the coupling-side convex portions 34, 34 are contacted or closely face each other without the rattling in the circumferential direction. Also, a driven-side gap 37 of which a circumferential width size increases towards one axial side is interposed between one end portion from the axially intermediate portion of the circumferential side surface of each of the driven-side convex portions 31, 31 and the circumferential side surface of each of the coupling-side convex portions 34, 34.

In addition, in the first example, grease (lubricant) is interposed at the engagement portion between the drive-side concave-convex portion 26 and the coupling-side concave-convex portion 35 and at the engagement portion between the driven-side concave-convex portion 32 and the coupling-side concave-convex portion 35. Also, shot blast is performed for at least one of the circumferential side surface of each of the drive-side convex portions 25 and the circumferential side surface of each of the coupling-side convex portions 34, 34, which face each other, and/or at least one of the circumferential side surface of each of the driven-side convex portions 31 and the circumferential side surface of each of the coupling-side convex portions 34, 34. Thereby, a strength of the at least one surface is improved and a plurality of minute concave portions, which are advantageous to keep therein the grease, is formed in the at least one surface.

According to the worm reduction gear 15 of the first example, even when the central axes of the output shaft 12*a* and the worm 8*a* are mismatched, it is possible to smoothly transmit the torque between the output shaft 12*a* and the worm 8*a* and to prevent an abnormal noise from being generated between the output shaft 12*a* and the worm 8*a*.

That is, in the first example, the drive-side gap 36 and the driven-side gap 37, which are the circumferential gaps, are respectively provided between the coupling-side concave-convex portion 35 and the drive-side concave-convex portion 26 and between the coupling-side concave-convex portion 35 and the driven-side concave-convex portion 32. Therefore, when the worm 8*a* is caused to oscillate and the central axes of the output shaft 12*a* and the worm 8*a* are thus mismatched as the worm teeth 6 is pressed towards the tooth part 5 by the preload applying mechanism 16, the coupling 20 is inclined relative to at least one of the output shaft 12*a* and the worm 8*a* on the basis of the drive-side gap 36 and the driven-side gap 37 (the coupling 20 is caused to oscillate). Thereby, it is possible to smoothly transmit the torque between the output shaft 12*a* and the worm 8*a*.

As described above, in the first example, the coupling 20 can be caused to oscillate on the basis of the drive-side gap 36 and the driven-side gap 37. For this reason, like the structure of the first example as described above, (at the state where the central axes of the output shaft 12*a* and the worm 8*a* are matched), it is possible to bring one axial end portion of the circumferential side surface of each of the drive-side convex portions 25, 25 into contact with or to closely face the circumferential side surface of each of the coupling-side convex portions 34, 34 without the rattling in the circumferential direction, and to bring the other axial end portion of the circumferential side surface of each of the driven-side convex portions 31, 31 into contact with or to closely face the circumferential side surface of each of the coupling-side convex portions 34, 34 without the rattling in the circumferential direction. As a result, it is possible to bring parts of the circumferential side surfaces of the drive-side convex portions 25 and the driven-side convex portions 31 into contact with or to closely face the circumferential side surfaces of the respective coupling-side convex portions 34, 34, irrespective of whether the central axes of the output shaft 12*a* and the worm 8*a* are matched or not. Therefore, upon start of the torque transmission between the output shaft 12*a* and the worm 8*a*, it is possible to prevent the circumferential side surface of each of the drive-side convex portions 25 and the driven-side convex portions 31 and the circumferential side surface of each of the coupling-side convex portions 34, 34 from strongly colliding (hard colliding) with each other. As a result, it is possible to prevent the abnormal noise such as the gear-tooth striking sound from being generated at the engagement portions between the drive-side concave-convex portion 26 and driven-side concave-convex portion 32 and the coupling-side concave-convex portion 35.

In addition, in the first example, the circumferential side surfaces of the drive-side convex portions 25, the driven-side convex portions 31 and the respective coupling-side convex portions 34, 34 are formed to have a crowning shape having a partial arc shape, as seen from the radial direction. Therefore, even when the coupling 20 is inclined relative to at least one of the output shaft 12*a* and the worm 8*a*, it is possible to prevent the drive-side concave-convex portion 26 and driven-side concave-convex portion 32 and the coupling-side concave-convex portion 35 from contacting each other at one side (eccentric contact) (i.e., it is possible to secure contact areas between the circumferential side surfaces of the drive-side convex portions 25 and driven-side convex portions 31 and the respective coupling-side convex portions 34, 34 to some extent). Therefore, it is possible to suppress the stress from being concentrated on the engagement portions between the drive-side concave-convex portion 26 and driven-side concave-convex portion 32 and the coupling-side concave-convex portion 35 or to suppress the wear at the engagement portions, so that it is possible to secure the durability of the torque-transmission joint 17 and the entire worm reduction gear 15.

Also, in the first example, since the grease is interposed at the engagement portions between the drive-side concave-convex portion 26 and driven-side concave-convex portion 32 and the coupling-side concave-convex portion 35, it is possible to cause the coupling 20 to smoothly oscillate. Additionally, in the first example, the shot blast is performed for at least one of the circumferential side surface of each of the drive-side convex portions 25 and the circumferential side surface of each of the coupling-side convex portions 34, 34, which face each other, and/or at least one of the circumferential side surface of each of the driven-side convex portions 31 and the circumferential side surface of each of the coupling-side convex portions 34, 34, so that the plurality of minute concave portions is formed in the at least one surface. The respective minute concave portions function as oil-keeping concave portions for keeping therein the grease, so that it is possible to easily keep the grease at the engagement portions between the drive-side concave-convex portion 26 and driven-side concave-convex portion 32 and the coupling-side concave-convex portion 35. For this reason, it is possible to smoothly transmit the torque between the output shaft 12*a* and the worm 8*a* and to further effectively suppress the one-side contact between the drive-side concave-convex portion 26 and driven-side concave-convex portion 32 and the coupling-side concave-convex portion 35.

Meanwhile, when implementing the first example, the drive-side transmission part 18 (the driven-side transmission part 19) may be directly formed at the tip end portion of the output shaft of the electric motor (the base end portion of the worm shaft) without the drive-side transmission member 22 (the driven-side transmission member 28). Also, the inner peripheral surface of the concave portion provided at the tip end portion of the output shaft of the electric motor may be formed with the drive-side concave-convex portion, the inner peripheral surface of the concave portion provided at the base end portion of the worm shaft may be formed with the driven-side concave-convex portion, and the coupling-side concave-convex portion provided on the outer peripheral surface of the coupling may be engaged with the drive-side concave-convex portion and the driven-side concave-convex portion.

[Second Example of Embodiment]

Figure 6A:
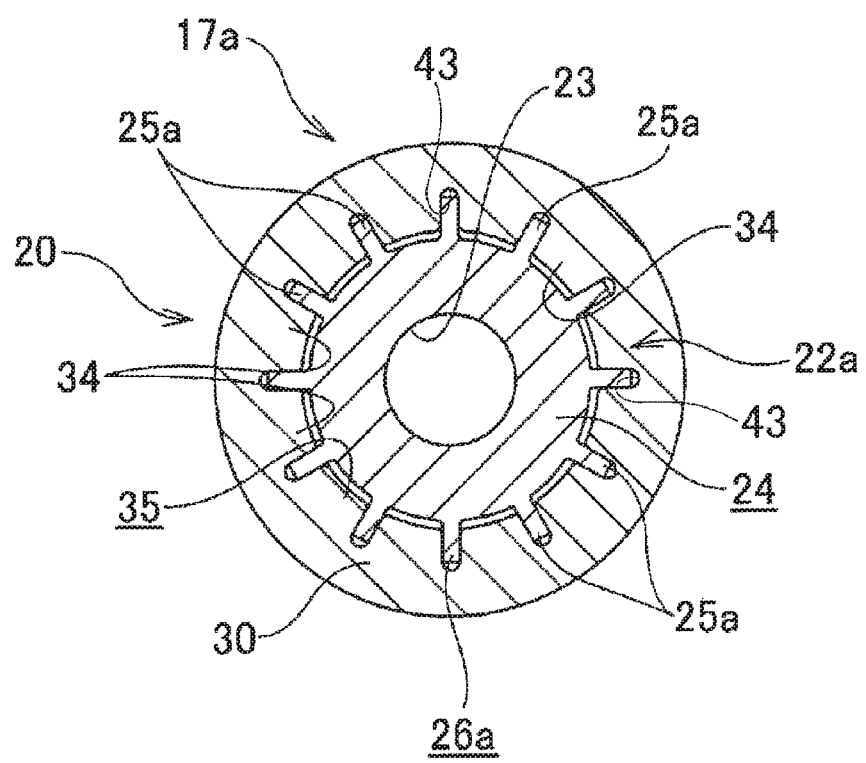
FIG. 6A is a view equivalent to FIG. 5A, depicting a second example of the embodiment.
Figure 6B:
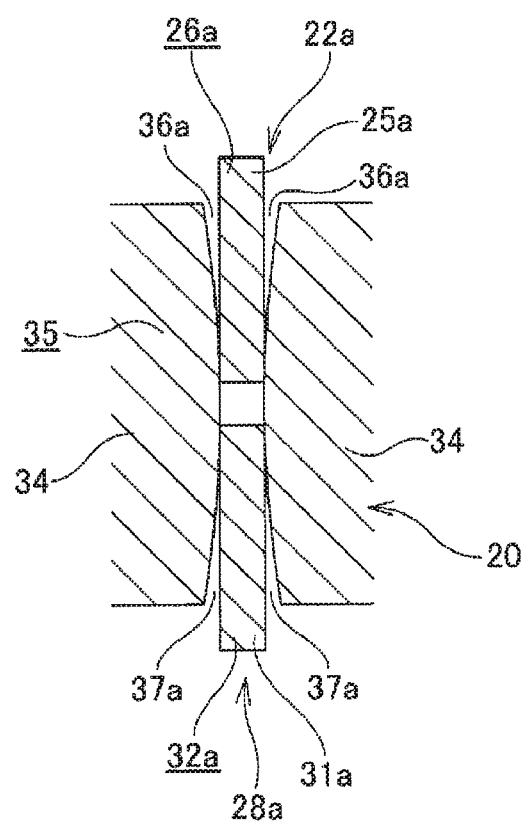
FIG. 6B is a view equivalent to FIG. 5B, depicting the second example of the embodiment.

FIGS. 6A and 6B depict a second example of the embodiment. In a torque-transmission joint 17*a* of the second example, both circumferential side surfaces of each of drive-side convex portions 25*a*, 25*a* configuring a drive-side concave-convex portion 26*a* of a drive-side transmission member 22*a* are flat surfaces parallel with each other. That is, a circumferential width size of each of the drive-side convex portions 25*a*, 25*a* is the same over the axial direction. Likewise, both circumferential side surfaces of each of driven-side convex portions 31*a*. 31*a* configuring a driven-side concave-convex portion 32*a* of a driven-side transmission member 28*a* are flat surfaces parallel with each other. That is, a circumferential width size of each of the driven-side convex portions 31*a*, 31*a* is the same over the axial direction. In the meantime, both circumferential side surfaces of each of the coupling-side convex portions 34, 34 configuring the coupling-side concave-convex portion 35 of the coupling 20 have a crowning shape having a partial arc shape inclined in a direction in which a circumferential width size of each of the coupling-side convex portions 34, 34 is greatest at the axially intermediate portion and decreases towards both axial end portions, as seen from the radial direction, like the first example of the embodiment.

Therefore, in the second example, at a state where the drive-side concave-convex portion 26*a* is engaged with the half portion on the other axial side of the coupling-side concave-convex portion 35 and the central axes of the output shaft 12*a* and the worm 8*a* (refer to FIG. 1) are matched, one axial end portion of the circumferential side surface of each of the drive-side convex portions 25*a*. 25*a* and the circumferential side surface of each of the coupling-side convex portions 34*a*, 34*a* are contacted or closely face each other without the rattling in the circumferential direction. Also, drive-side gaps 36*a*, 36*a* of which a circumferential width size increases towards the other axial side are interposed between the other end portions from the axially intermediate portions of the circumferential side surfaces of the respective drive-side convex portions 25*a*, 25*a* and the circumferential side surfaces of the respective coupling-side convex portions 34, 34.

Also, at a state where the driven-side concave-convex portion 32*a* is engaged with one axial end portion of the coupling-side concave-convex portion 35 and the central axes of the output shaft 12*a* and the worm 8*a* are matched, the other axial end portion of the circumferential side surface of each of the driven-side convex portion 31*a*, 31*a* and the circumferential side surface of each of the coupling-side convex portions 34, 34 are contacted or closely face each other without the rattling in the circumferential direction. Also, driven-side gaps 37*a*, 37*a* of which a circumferential width size increases towards one axial side are interposed between one end portions from the axially intermediate portions of the circumferential side surfaces of the respective driven-side convex portion 31*a*, 31*a* and the circumferential side surfaces of the respective coupling-side convex portions 34, 34.

Also in the second example, like the first example of the first embodiment, even when the central axes of the output shaft 12*a* and the worm 8*a* are mismatched, it is possible to smoothly transmit the torque between the output shaft 12*a* and the worm 8*a* and to prevent the abnormal noise from being generated between the output shaft 12*a* and the driven shaft 8*a*.

The other configurations and operations are the same as the first example of the embodiment.

[Third Example of Embodiment]

FIGS. 7 to 13 depict a third example of the embodiment. In the coupling 20 of the third example, at least one coupling-side protrusion 38 is formed at the axially intermediate portion of the inner peripheral surface of the coupling-side cylindrical part 33. The coupling-side protrusion 50 is formed between the drive-side transmission part 18 and the driven-side transmission part 19 in the axial direction.

Figure 7:
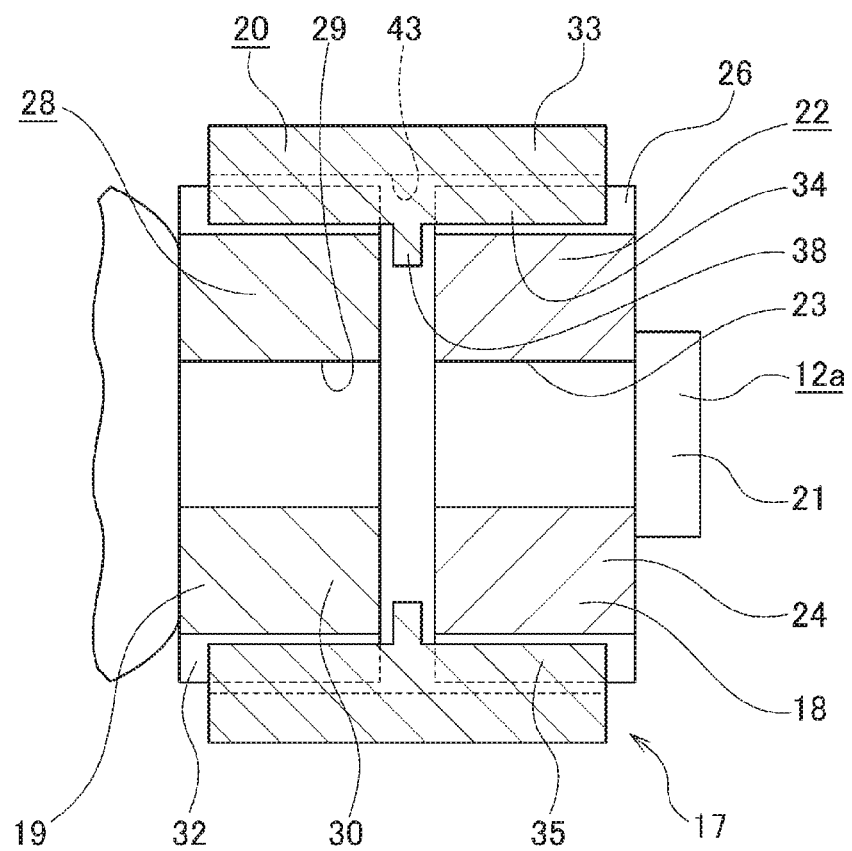
FIG. 7 is an enlarged sectional view of main parts, depicting a third example of the embodiment.

In an example of FIG. 7, the coupling-side protrusion 38 protrudes radially inwards from the coupling-side convex portion 34. The coupling-side protrusion 38 axially faces the drive-side cylindrical part 24 and the driven-side cylindrical part 30 with gaps interposed therebetween. However, like an example of FIG. 8, the coupling-side protrusion 50 may be in contact with the drive-side cylindrical part 24 and the driven-side cylindrical part 30 without the axial gaps.

Figure 8:
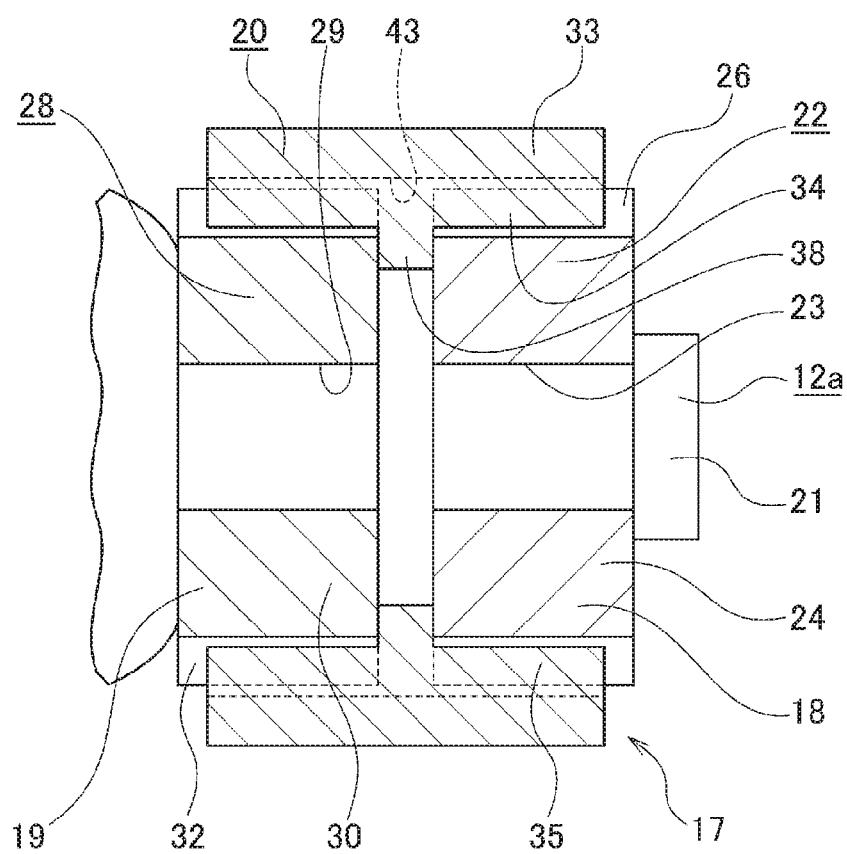
FIG. 8 is an enlarged sectional view of main parts, depicting a modified embodiment of the third example of the embodiment.

Meanwhile, in the examples of FIGS. 7 and 8, the coupling-side protrusion 38 is formed for each of the coupling-side convex portions 34. However, at least one coupling-side protrusion 38 may be formed. For example, some of the coupling-side convex portions 34 may be selected and the coupling-side protrusion 38 may be formed for each of the selected coupling-side convex portions 34.

According to this example, since the at least one coupling-side protrusion 38 faces the drive-side cylindrical part 24 and the driven-side cylindrical part 30 in the axial direction, axial displacement of the coupling 20 is restrained by the drive-side cylindrical part 24 or the driven-side cylindrical part 30.

Figure 9:
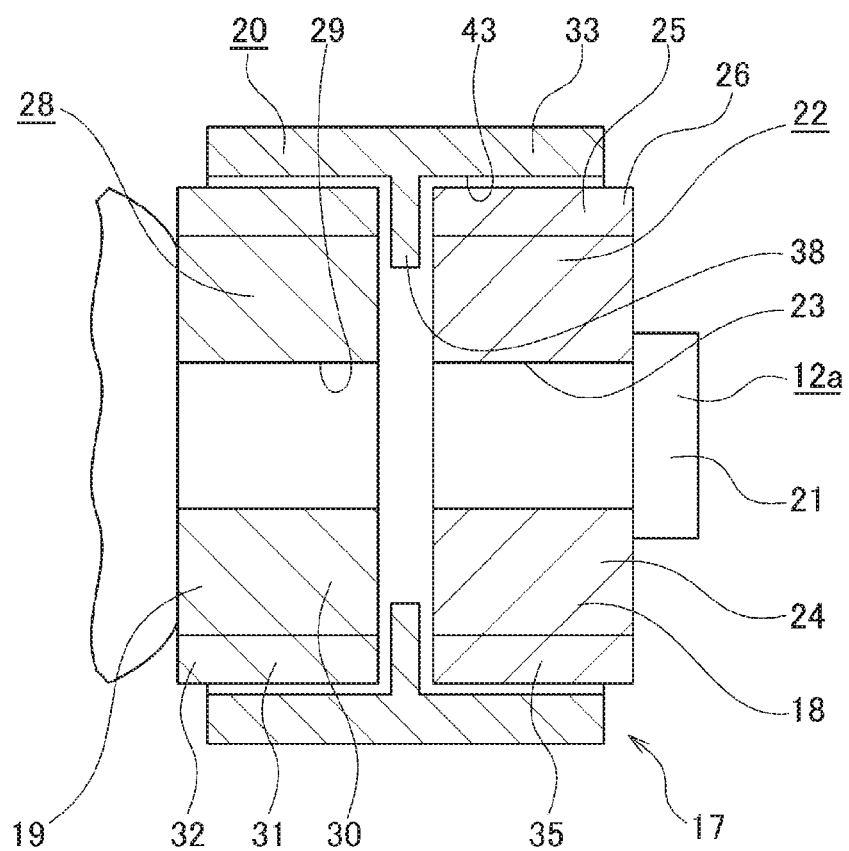
FIG. 9 is an enlarged sectional view of main parts, depicting a modified embodiment of the third example of the embodiment.

In an example of FIG. 9, the coupling-side protrusion 38 protrudes radially inwards from the coupling-side concave portion 43. A tip end portion (radially inner end portion) of the coupling-side protrusion 38 is positioned at the radially inner side relative to the drive-side concave-convex portion 26 and the driven-side concave-convex portion 32. Also, the coupling-side protrusion 38 axially faces the drive-side convex portion 25 and driven-side convex portion 31 and the drive-side cylindrical part 24 and driven-side cylindrical part 30 with gaps being interposed therebetween. However, like an example of FIG. 10, the coupling-side protrusion 38 may be in contact with the drive-side convex portion 25 and driven-side convex portion 31 and the drive-side cylindrical part 24 and driven-side cylindrical part 30 without the axial gaps.

Figure 10:
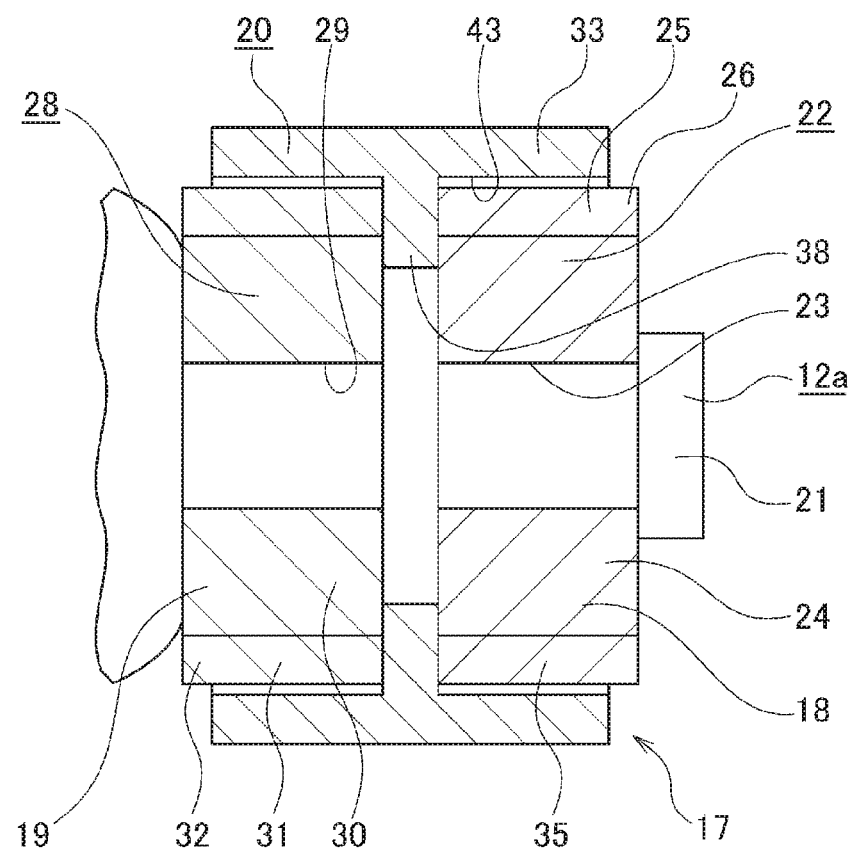
FIG. 10 is an enlarged sectional view of main parts, depicting a modified embodiment of the third example of the embodiment.

Meanwhile, in the examples of FIGS. 9 and 10, the coupling-side protrusion 38 is formed for each of the coupling-side concave portions 43. However, at least one coupling-side protrusion 38 may be formed. For example, some of the coupling-side concave portions 43 may be selected and the coupling-side protrusion 38 may be formed for each of the selected coupling-side concave portions 43.

According to this example, since the at least one coupling-side protrusion 38 faces the drive-side convex portion 25 and driven-side convex portion 31 and the drive-side cylindrical part 24 and driven-side cylindrical part 30 in the axial direction, the axial displacement of the coupling 20 is restrained by the drive-side convex portion 25 and driven-side convex portion 31 and the drive-side cylindrical part 24 or the driven-side cylindrical part 30.

Figure 11:
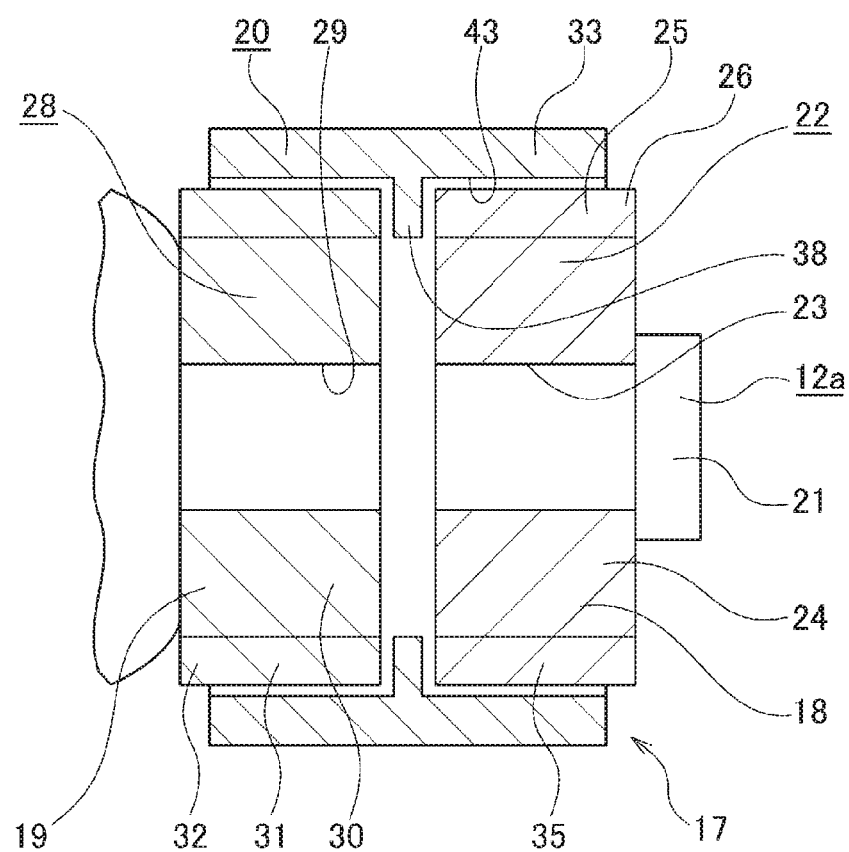
FIG. 11 is an enlarged sectional view of main parts, depicting a modified embodiment of the third example of the embodiment.

An example of FIG. 11 is the same as the example of FIG. 9, in that the coupling-side protrusion 38 protrudes radially inwards from the coupling-side concave portion 43. However, the example of FIG. 11 is different from the example of FIG. 9, in that the tip end portion (radially inner end portion) of the coupling-side protrusion 38 overlaps with the drive-side concave-convex portion 26 and the driven-side concave-convex portion 32 in the radial direction. Also, in the example of FIG. 11, the coupling-side protrusion 38 axially faces the drive-side convex portion 25 and the driven-side convex portion 31 with the gaps being interposed therebetween. However, like an example of FIG. 12, the coupling-side protrusion 38 may be in contact with the drive-side convex portions 25 and the driven-side convex portions 31 without the axial gaps.

Figure 12:
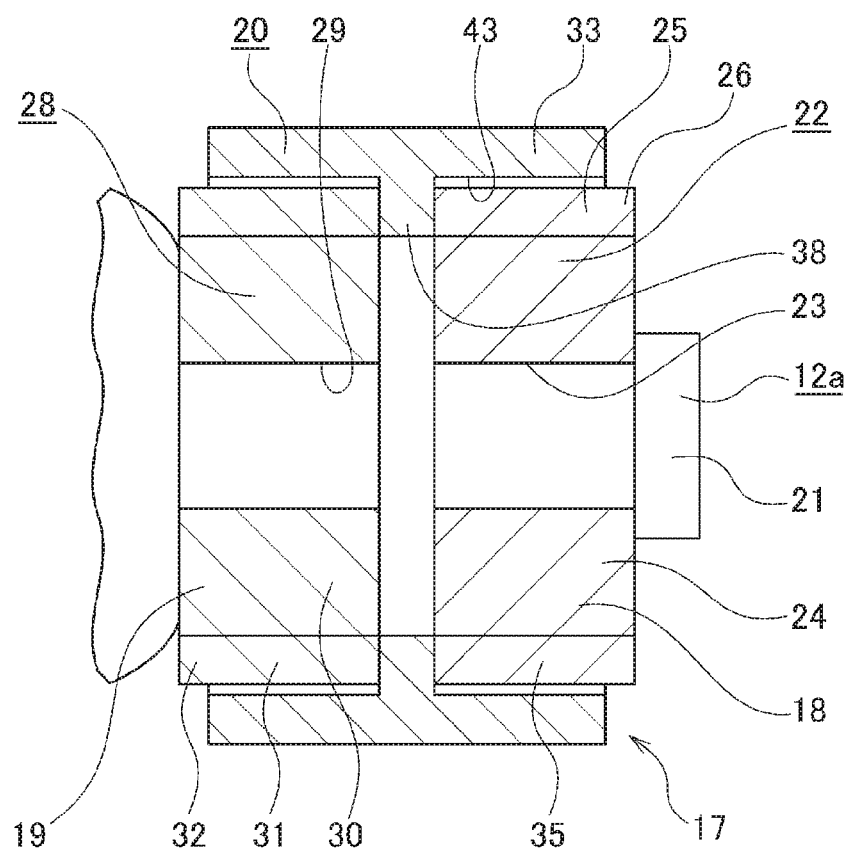
FIG. 12 is an enlarged sectional view of main parts, depicting a modified embodiment of the third example of the embodiment.

Meanwhile, in the examples of FIGS. 11 and 12, the coupling-side protrusion 38 is formed for each of the coupling-side concave portions 43. However, at least one coupling-side protrusion 38 may be formed. For example, some of the coupling-side concave portions 43 may be selected and the coupling-side protrusion 38 may be formed for each of the selected coupling-side concave portions 43.

According to this example, since the at least one coupling-side protrusion 38 faces the drive-side convex portion 25 and the driven-side convex portion 31 in the axial direction, the axial displacement of the coupling 20 is restrained by the drive-side convex portion 25 and the driven-side convex portion 31.

In the meantime, the coupling 20 may be configured by combining the plurality of types of coupling-side protrusions 38 shown in FIGS. 7 to 12. For example, in one coupling 20, the coupling-side protrusion 38 of FIG. 7 may be formed for the coupling-side convex portion 34 and the coupling-side protrusion 38 of FIG. 9 may be formed for the coupling-side concave portion 43.

According to this example, since the inner peripheral surface of the coupling-side cylindrical part 33 is formed with the annular coupling-side protrusion 38 between the drive-side transmission part 18 and the driven-side transmission part 19 in the axial direction, the axial displacement of the coupling 20 is restrained by the drive-side transmission part 18 or the driven-side transmission part 19, so that the axial position of the coupling 20b becomes stable.

In the meantime, when the outer peripheral surface of the coupling is provided with the coupling-side concave-convex portion, the coupling-side protrusion is preferably provided on the outer peripheral surface of the coupling.

[Fourth Example of Embodiment]

Figure 13:
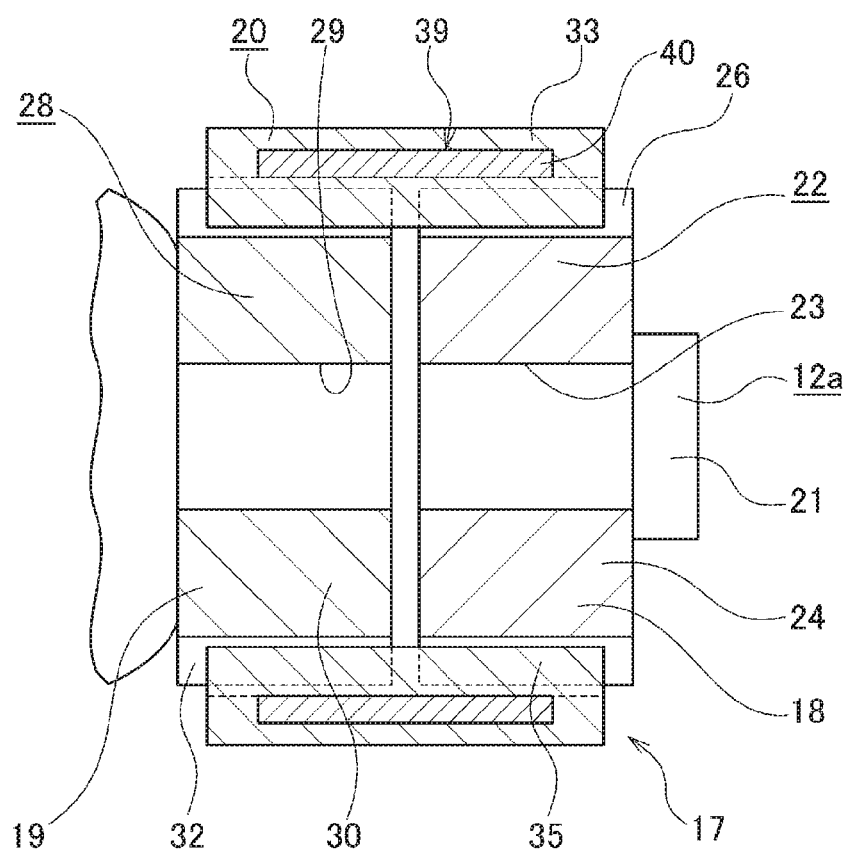
FIG. 13 is an enlarged sectional view of main parts, depicting a fourth example of the embodiment.
Figure 14:
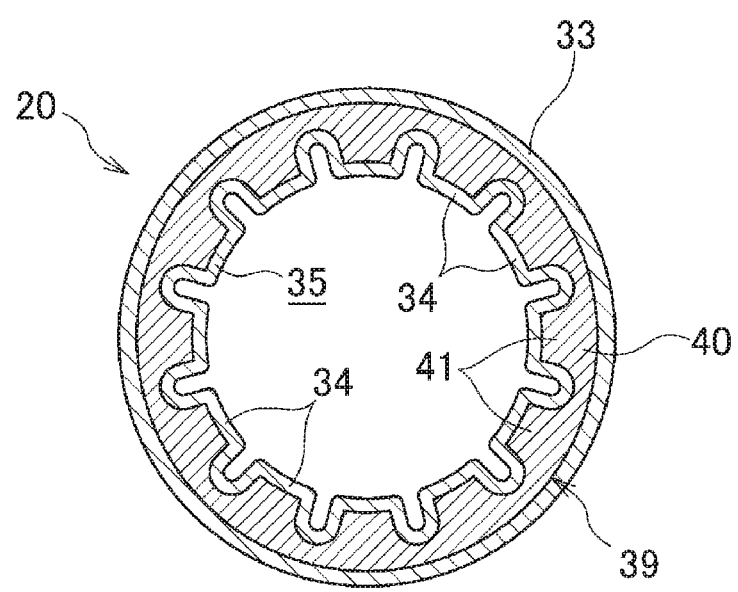
FIG. 14 is a sectional view of the coupling.

FIGS. 13 and 14 depict a fourth example of the embodiment. In the coupling 20 of the fourth example, a core bar 45 having a circle ring shape as a whole is arranged in the coupling-side cylindrical part 33. The core bar 45 has a cylindrical part 40 concentric with the coupling 20. The cylindrical part 40 at least axially overlaps with the engagement portions between the drive-side concave-convex portion 26 and driven-side concave-convex portion 32 and the coupling-side concave-convex portion 35. In an example of FIG. 13, an axial length of the cylindrical part 40 is about a half of an axial length of the coupling 20 but may be configured to be the same as the axial length of the coupling 20.

As shown in FIG. 14, the core bar 45 may have a plurality of convex portions 41 protruding radially inwards from an inner peripheral surface of the cylindrical part 40 with equal intervals in the circumferential direction. The plurality of convex portions 41 is provided at positions at which they overlap with the plurality of coupling-side convex portions 34 of the coupling 20 in the circumferential direction as many as the coupling-side convex portions. On the other hand, the number of the convex portions 41 may not be the same as the plurality of coupling-side convex portions 34. A circumferential length of the convex portion 47 is equal to or smaller than a circumferential length of the coupling-side convex portion 34.

According to the fourth example, since the core bar 45 is arranged in the coupling 20, it is possible to improve the rigidity of the coupling 20. In particular, since the core bar 45 at least axially overlaps with the engagement portions between the drive-side concave-convex portion 26 and driven-side concave-convex portion 32 and the coupling-side concave-convex portion 35, it is possible to improve the effect of the rigidity improvement of the coupling 20 on the rotation torque. Also, when the core bar 45 is provided with the plurality of convex portions 41, the rigidity of the coupling 20 is further improved.

[Fifth Example of Embodiment]

Figure 15:
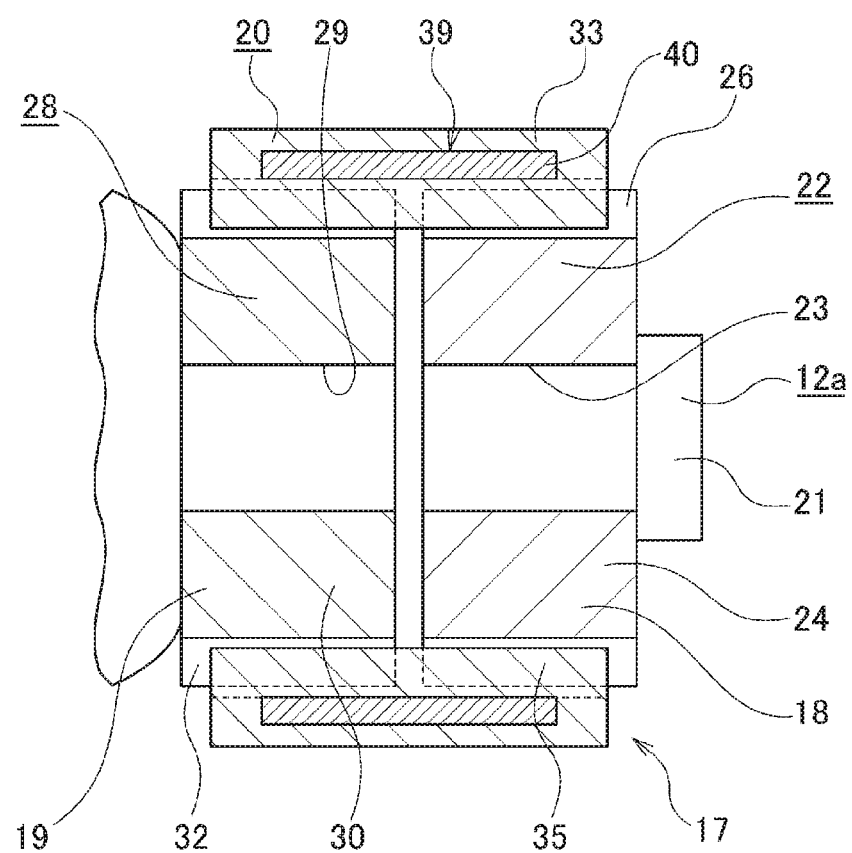
FIG. 15 is an enlarged sectional view of main parts, depicting a fifth example of the embodiment.
Figure 16:
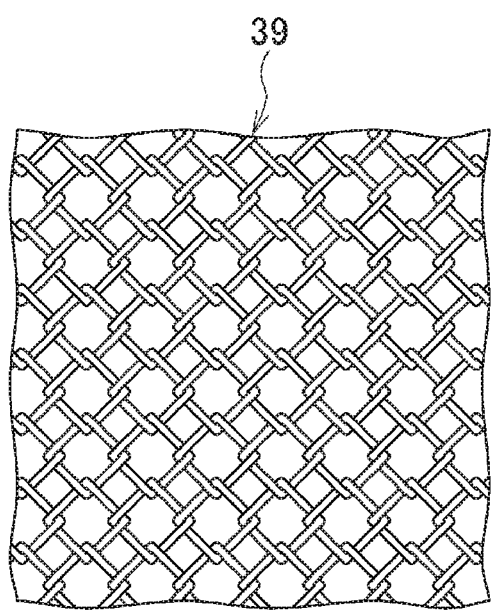
FIG. 16 is a partially developed view of a core bar configuring the coupling.

FIGS. 15 and 16 depict a fifth example of the embodiment of the present invention. Also in the coupling 20 of the fifth example, the core bar 45 is arranged in the coupling-side cylindrical part 33, like the fourth example. However, the core bar 45 of the fifth example is configured by rolling a metal mesh-shaped sheet or a chain-shaped metal member as shown in FIG. 16 into a cylinder shape.

According to the fifth example, it is possible to improve the rigidity of the coupling 20, like the fourth example. In addition, since the coupling 20 can be easily bent, the coupling 20 is caused to oscillate more flexibly when the worm 8a is caused to oscillate. Therefore, it is possible to further smoothly transmit the torque between the output shaft 12a and the worm 8a.

[Sixth Example of Embodiment]

Figure 17:
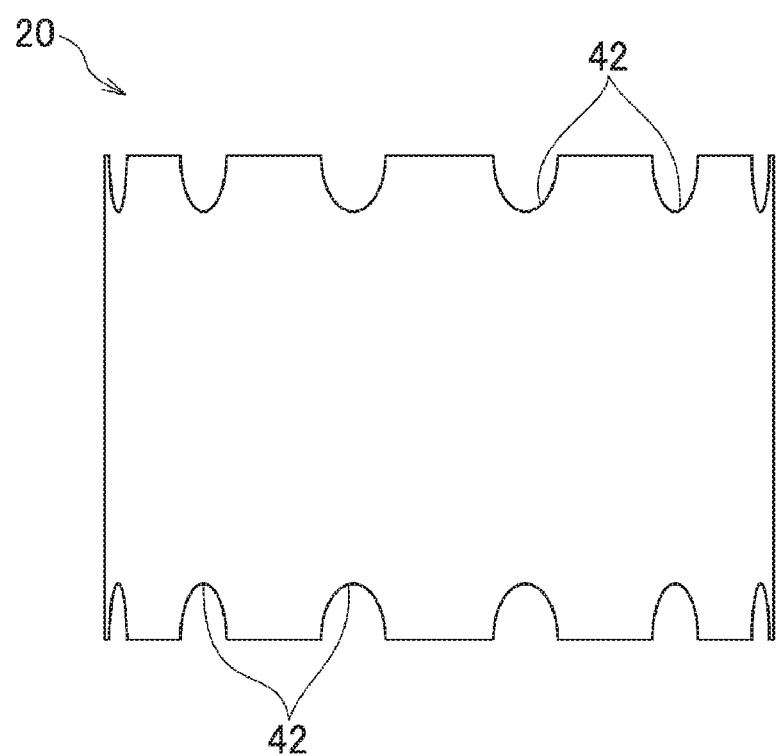
FIG. 17 depicts the coupling of a sixth example of the embodiment, as seen from a radially outer side.
Figure 18:
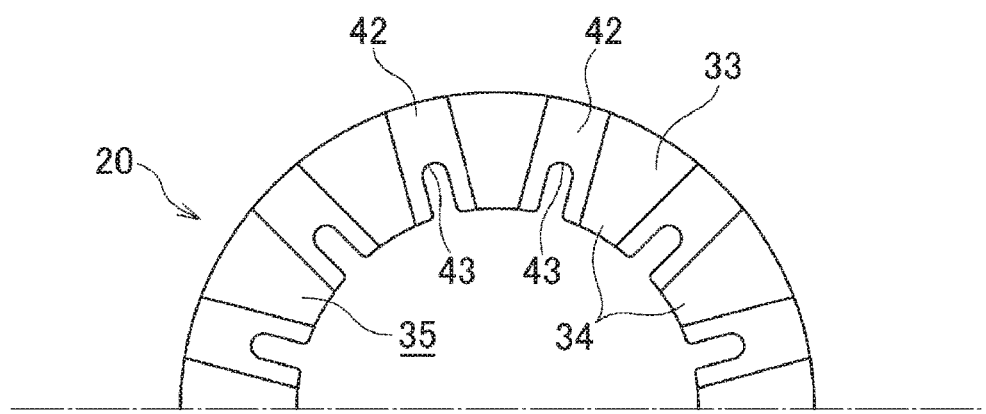
FIG. 18 depicts the coupling, as seen from an axially outer side.
Figure 19:
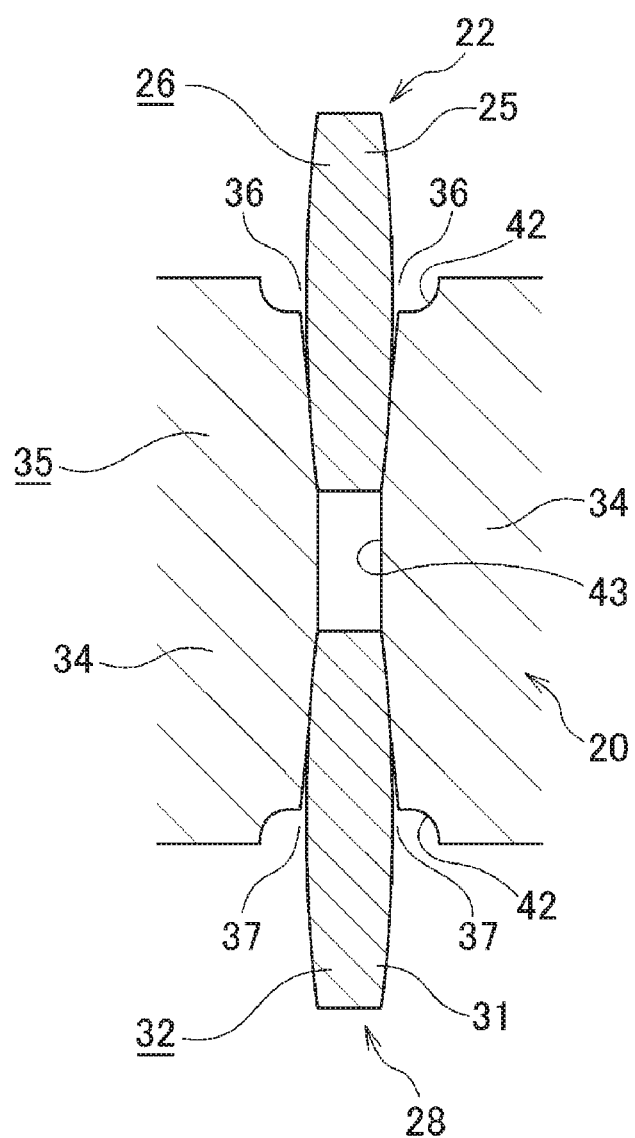
FIG. 19 is a view equivalent to FIG. 5B, depicting the sixth example of the embodiment.
Figure 20:
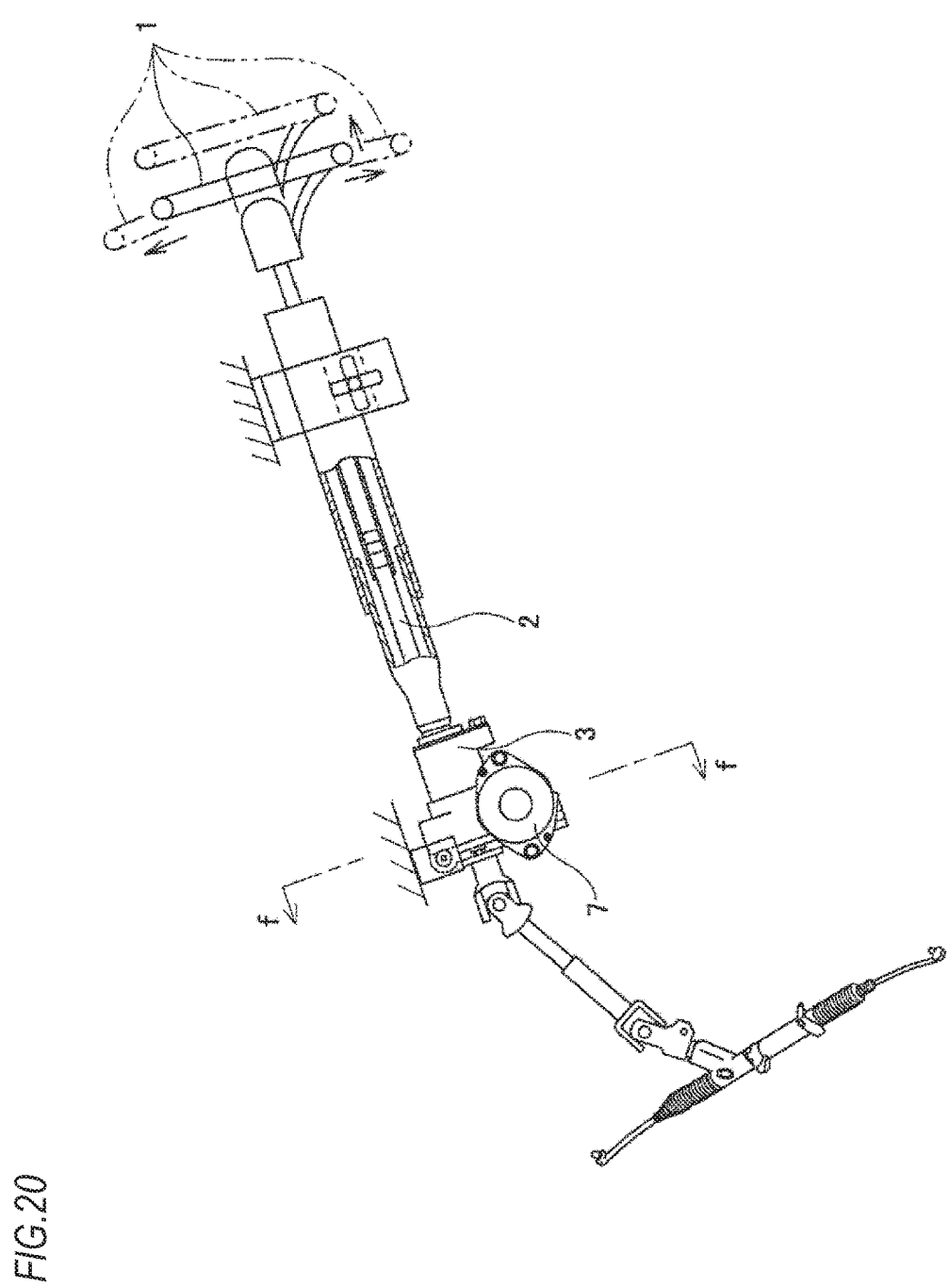
FIG. 20 is a partially longitudinal side view depicting an example of a steering device for an automobile.

FIGS. 17 to 19 depict a sixth example of the embodiment of the present invention. In the sixth example, both axial side surfaces of the coupling 20 are formed with a plurality of coupling-side groove portions 42 recessed in the axially inner direction with equal intervals in the circumferential direction. As shown in FIG. 18, the coupling-side groove portions 42 are provided in the radial direction from a radially outer end portion to a radially inner end portion of the coupling-side cylindrical part 33. The coupling-side groove portions 42 are formed between the coupling-side convex portions 34 adjacent to each other in the circumferential direction, and are arranged at position at which the coupling-side groove portions overlap with the coupling-side concave portions 43 configuring the coupling-side concave-convex portion 35 in the circumferential direction. A circumferential width of each of the coupling-side groove portions 42 is greater than the circumferential width of each of the coupling-side concave portions 43.

According to the sixth example, as shown in FIG. 19, the coupling-side groove portions 42 are provided, so that the drive-side gap 36 and the driven-side gap 37 are widened as much as that. Therefore, the contact areas between the coupling 20 and the drive-side transmission part 18 and driven-side transmission part 19 are reduced, so that the friction at the contact parts is reduced. That is, when the worm 8a is caused to oscillate and the central axes of the output shaft 12a and the worm 8a are thus mismatched, the coupling 20 is caused to oscillate on the basis of the drive-side gap 36 and the driven-side gap 37. However, the friction can be reduced at that time. Also, it is possible to easily absorb the oscillations of the drive-side transmission part 18 and the driven-side transmission part 19.

The subject application is based on a Japanese Patent Application No. 2015-087823 filed on Apr. 22, 2015, which is herein incorporated by reference.

INDUSTRIAL APPLICABILITY

When implementing the present invention, instead of the structures of the above-described examples of the embodiment, the circumferential side surface of each of the coupling-side convex portions provided for the coupling may be formed to have a crowning shape, and the circumferential side surfaces of the drive-side convex portions and the driven-side convex portions may be inclined in a direction in which the circumferential width size decreases towards both sides of the coupling in a width direction (axis direction).

DESCRIPTION OF REFERENCE NUMERALS

1: steering wheel, 2: steering shaft, 3: housing, 4: worm wheel, 5: tooth part, 6: worm teeth, 7: electric motor, 8, 8a: worm, 9a, 9b: rolling bearing, 10: pressing piece, 11: coil spring, 12, 12a: output shaft, 13: spline hole, 14: spline shaft part, 15: worm reduction gear, 16: preload applying mechanism, 17, 17a: torque-transmission joint, 18: drive-side transmission part, 19: driven-side transmission part, 20: coupling, 21: output shaft main body, 22, 22a: drive-side transmission member, 23: drive-side engaging hole, 24: drive-side cylindrical part, 25, 25a: drive-side convex portion, 26, 26a: drive-side concave-convex portion, 27: worm shaft main body, 28, 28a: driven-side transmission member, 29: driven-side engaging hole, 30, 30a: driven-side cylindrical part, 31, 31a: driven-side convex portion, 32, 32a: driven-side concave-convex portion, 33: coupling-side cylindrical part, 34: coupling-side convex portion, 35: coupling-side concave-convex portion, 36, 36a: drive-side gap, 37, 37a: driven-side gap, 38: coupling-side protrusion, 39: core bar, 40: cylindrical part, 41: convex portion, 42: coupling-side groove portion, 43: coupling-side concave portion

The invention claimed is:

1. A torque-transmission joint configured to transmit torque between one axial end portion of a drive shaft and the other axial end portion of a driven shaft arranged in series with each other in an axial direction, the torque-transmission joint comprising:
a coupling provided on one circumferential surface of inner and outer circumferential surfaces with a coupling-side concave-convex portion having coupling-side convex portions arranged at a plurality of circumferential places and protruding in a radial direction;
a drive-side transmission part provided at one axial end portion of the drive shaft and provided on one circumferential surface, which faces the coupling-side concave-convex portion, of inner and outer circumferential surfaces with a drive-side concave-convex portion having drive-side convex portions arranged at a plurality of circumferential places and protruding in a radial direction; and
a driven-side transmission part is provided at the other axial end portion of the driven shaft and provided on one circumferential surface, which faces the coupling-side concave-convex portion, of inner and outer circumferential surfaces with a driven-side concave-convex portion having driven-side convex portions arranged at a plurality of circumferential places and protruding in a radial direction;
wherein at a state where central axes of the drive shaft and the driven shaft are matched, the drive-side concave-convex portion is engaged with a half portion on the other axial side of the coupling-side concave-convex portion with a drive-side gap of which a circumferential width size increases towards the other axial side being interposed between a circumferential side surface of each drive-side convex portion and a circumferential side surface of each coupling-side convex portion and
wherein at the state where the central axes of the drive shaft and the driven shaft are matched, the driven-side concave-convex portion is engaged with a half portion on one axial side of the coupling-side concave-convex portion with a driven-side gap of which a circumferential width size increases towards one axial side being interposed between a circumferential side surface of each driven-side convex portion and a circumferential side surface of each coupling-side convex portion.

2. The torque-transmission joint according to claim 1,
wherein the circumferential side surface of each drive-side convex portion is inclined in a direction in which a circumferential width size of each drive-side convex portion decreases towards one axial side in an engaging part of the drive-side concave-convex portion and the half portion on the other axial side of the coupling-side concave-convex portion, and
wherein the circumferential side surface of each driven-side convex portion is inclined in a direction in which a circumferential width size of each driven-side convex portion decreases towards the other axial side in an engaging part of the driven-side concave-convex portion and the half portion on one axial side of the coupling-side concave-convex portion.

3. The torque-transmission joint according to claim 1,
wherein the circumferential side surface of each coupling-side convex portion is inclined in a direction in which a circumferential width size of each coupling-side convex portion is greatest at an axially intermediate portion and decreases towards both axial end portions.

4. The torque-transmission joint according to claim 1,
wherein grease is interposed between both the drive-side and driven-side concave-convex portions and the coupling-side concave-convex portion.

5. The torque-transmission joint according to claim 4,
wherein at least one of the circumferential side surface of each of the drive-side and driven-side convex portions and the circumferential side surface of each coupling-side convex portion is provided with a plurality of minute concave portions.

6. The torque-transmission joint according claim 1,
wherein one circumferential surface of both the inner and outer circumferential surfaces of the coupling is formed with a coupling-side protrusion protruding in the radial direction, and
wherein the coupling-side protrusion is positioned between the drive-side transmission part and the driven-side transmission part in the axial direction.

7. The torque-transmission joint according to claim 1,
wherein both axial side surfaces of the coupling are formed with coupling-side groove portions at a plurality of places in the circumferential direction, and wherein the coupling-side groove portions are arranged at positions at which the coupling-side groove portions overlap with coupling-side concave portions, which are formed between the coupling-side convex portions adjacent to each other in the circumferential direction and which configures the coupling-side concave-convex portion, in the circumferential direction.

8. The torque-transmission joint according to claim 7, wherein a gap is formed between the drive-side convex portion and the coupling-side groove portion in the radial direction; and wherein a gap is formed between the driven-side convex portion and the coupling-side groove portion in the radial direction.

9. A worm reduction gear comprising:
a housing;
a worm wheel rotatably supported to the housing;
a worm rotatably supported to the housing at a state where worm teeth provided on an axially intermediate portion thereof are meshed with the worm wheel; and
an electric motor configured to rotatively drive the worm;
wherein the worm and an output shaft of the electric motor are connected by a torque-transmission joint so that torque can be transmitted therebetween, and
wherein the torque-transmission joint is the torque-transmission joint according to claim 1.

10. A torque-transmission joint configured to transmit torque between one axial end portion of a drive shaft and the other axial end portion of a driven shaft arranged in series with each other in an axial direction, the torque-transmission joint comprising:
a coupling provided on one circumferential surface of inner and outer circumferential surfaces with a coupling-side concave-convex portion having coupling-side convex portions arranged at a plurality of circumferential places and protruding in a radial direction;
a drive-side transmission part provided at one axial end portion of the drive shaft and provided on one circumferential surface, which faces the coupling-side concave-convex portion, of inner and outer circumferential surfaces with a drive-side concave-convex portion having drive-side convex portions arranged at a plurality of circumferential places and protruding in a radial direction; and
a driven-side transmission part is provided at the other axial end portion of the driven shaft and provided on one circumferential surface, which faces the coupling-side concave-convex portion, of inner and outer circumferential surfaces with a driven-side concave-convex portion having driven-side convex portions arranged at a plurality of circumferential places and protruding in a radial direction;
wherein the circumferential side surface of each drive-side convex portion is inclined in a direction in which a circumferential width size of each drive-side convex portion is decreases towards one axial side in an engaging part of the drive-side concave-convex portion and the half portion on the other axial side of the coupling-side concave-convex portion, and
wherein the circumferential side surface of each driven-side convex portion is inclined in a direction in which a circumferential width size of each driven-side convex portion is decreases towards the other axial side in an engaging part of the driven-side concave-convex portion and the half portion on one axial side of the coupling-side concave-convex portion.

11. The torque-transmission joint according to claim 10, wherein at a state where central axes of the drive shaft and the driven shaft are matched, the drive-side concave-convex portion is engaged with a half portion on the other axial side of the coupling-side concave-convex portion with a drive-side gap of which a circumferential width size increases towards the other axial side being interposed between a circumferential side surface of each drive-side convex portion and a circumferential side surface of each coupling-side convex portion and wherein at the state where the central axes of the drive shaft and the driven shaft are matched, the driven-side concave-convex portion is engaged with a half portion on one axial side of the coupling-side concave-convex portion with a driven-side gap of which a circumferential width size increases towards one axial side being interposed between a circumferential side surface of each driven-side convex portion and a circumferential side surface of each coupling-side convex portion.

12. The torque-transmission joint according to claim 10, wherein the circumferential side surface of each coupling-side convex portion is inclined in a direction in which a circumferential width size of each coupling-side convex portion is greatest at an axially intermediate portion and decreases towards both axial end portions.

13. The torque-transmission joint according to claim 10, wherein grease is interposed between both the drive-side and driven-side concave-convex portions and the coupling-side concave-convex portion.

14. The torque-transmission joint according to claim 13, wherein at least one of the circumferential side surface of each of the drive-side and driven-side convex portions and the circumferential side surface of each coupling-side convex portion is provided with a plurality of minute concave portions.

15. The torque-transmission joint according to claim 10, wherein one circumferential surface of both the inner and outer circumferential surfaces of the coupling is formed with a coupling-side protrusion protruding in the radial direction, and
wherein the coupling-side protrusion is positioned between the drive-side transmission part and the driven-side transmission part in the axial direction.

16. The torque-transmission joint according to claim 10, wherein both axial side surfaces of the coupling are formed with coupling-side groove portions at a plurality of places in the circumferential direction, and
wherein the coupling-side groove portions are arranged at positions at which the coupling-side groove portions overlap with coupling-side concave portions, which are formed between the coupling-side convex portions adjacent to each other in the circumferential direction and which configures the coupling-side concave-convex portion, in the circumferential direction.

17. The torque-transmission joint according to claim 16, wherein a gap is formed between the drive-side convex portion and the coupling-side groove portion in the radial direction; and
wherein a gap is formed between the driven-side convex portion and the coupling-side groove portion in the radial direction.

18. A worm reduction gear comprising:
a housing;
a worm wheel rotatably supported to the housing;
a worm rotatably supported to the housing at a state where worm teeth provided on an axially intermediate portion thereof are meshed with the worm wheel; and
an electric motor configured to rotatively drive the worm;

wherein the worm and an output shaft of the electric motor are connected by a torque-transmission joint so that torque can be transmitted therebetween, and wherein the torque-transmission joint is the torque-transmission joint according to claim 10.

19. A torque-transmission joint configured to transmit torque between one axial end portion of a drive shaft and the other axial end portion of a driven shaft arranged in series with each other in an axial direction, the torque-transmission joint comprising:
- a coupling provided on one circumferential surface of inner and outer circumferential surfaces with a coupling-side concave-convex portion having coupling-side convex portions arranged at a plurality of circumferential places and protruding in a radial direction;
- a drive-side transmission part provided at one axial end portion of the drive shaft and provided on one circumferential surface, which faces the coupling-side concave-convex portion, of inner and outer circumferential surfaces with a drive-side concave-convex portion having drive-side convex portions arranged at a plurality of circumferential places and protruding in a radial direction; and
- a driven-side transmission part is provided at the other axial end portion of the driven shaft and provided on one circumferential surface, which faces the coupling-side concave-convex portion, of inner and outer circumferential surfaces with a driven-side concave-convex portion having driven-side convex portions arranged at a plurality of circumferential places and protruding in a radial direction;

wherein at a state where central axes of the drive shaft and the driven shaft are matched, the drive-side concave-convex portion is engaged with a half portion on the other axial side of the coupling-side concave-convex portion with a drive-side gap of which a circumferential width size changes in the axial direction being interposed between a circumferential side surface of each drive-side convex portion and a circumferential side surface of each coupling-side convex portion and wherein at the state where the central axes of the drive shaft and the driven shaft are matched, the driven-side concave-convex portion is engaged with a half portion on one axial side of the coupling-side concave-convex portion with a driven-side gap of which a circumferential width size changes in the axial direction interposed between a circumferential side surface of each driven-side convex portion and a circumferential side surface of each coupling-side convex portion.

* * * * *